United States Patent
Kim

(10) Patent No.: US 10,409,963 B2
(45) Date of Patent: Sep. 10, 2019

(54) IMAGE PROCESSING APPARATUS AND CONTROL METHOD FOR RECEIVING AND PROCESSING ENCRYPTED IMAGE SIGNALS

(71) Applicant: Samsung Electronics Co., Ltd., Suwon-si (KR)

(72) Inventor: Je-ik Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/872,360

(22) Filed: Oct. 1, 2015

(65) Prior Publication Data
US 2016/0098544 A1    Apr. 7, 2016

(30) Foreign Application Priority Data
Oct. 2, 2014    (KR) .................. 10-2014-0133237

(51) Int. Cl.
H04K 1/00    (2006.01)
H04N 7/167    (2011.01)
H04L 29/06    (2006.01)
G06F 12/14    (2006.01)
G06F 3/00    (2006.01)
(Continued)

(52) U.S. Cl.
CPC ............ *G06F 21/10* (2013.01); *G06T 1/0007* (2013.01); *H04N 21/44004* (2013.01); *H04N 21/4405* (2013.01); *H04N 21/4408* (2013.01); *H04N 21/4348* (2013.01)

(58) Field of Classification Search
CPC ... G06F 21/10; G06T 1/0007; H04N 21/4408; H04N 21/44004; H04N 21/4405; H04N 21/4348

USPC ................ 380/203, 217, 269; 713/165, 189; 710/56; 711/146, 152
See application file for complete search history.

(56) References Cited

U.S. PATENT DOCUMENTS 6,236,727 B1 *  5/2001  Ciacelli .................. G06F 21/10
                                                           380/212
6,381,656 B1 *  4/2002  Shankman .......... G06F 11/3485
                                                            710/18
(Continued)

FOREIGN PATENT DOCUMENTS

CN        100514471 C      7/2009
EP        2104102          9/2009
(Continued)

OTHER PUBLICATIONS

Extended European Search Report dated Feb. 26, 2016 in European Patent Application No. 15187724.8.
(Continued)

*Primary Examiner* — Aravind K Moorthy
(74) *Attorney, Agent, or Firm* — Staas & Halsey LLP

(57) ABSTRACT

An image processing apparatus includes: a signal receiver configured to receive an encrypted image signal; a storage configured to temporarily store the encrypted image signal received in the signal receiver; a signal decryptor configured to convert the encrypted image signal into a decrypted image signal by decrypting the encrypted image signal output from the storage with a preset first secret key; and a decoder configured to decode the decrypted image signal output from the signal decryptor to be displayed an image.

17 Claims, 18 Drawing Sheets

(51) Int. Cl.
*G06F 13/28* (2006.01)
*G06F 21/10* (2013.01)
*H04N 21/44* (2011.01)
*H04N 21/4405* (2011.01)
*H04N 21/4408* (2011.01)
*G06T 1/00* (2006.01)
*H04N 21/434* (2011.01)

(56) References Cited

U.S. PATENT DOCUMENTS

| | | | |
|---|---|---|---|
| 7,242,766 B1* | 7/2007 | Lyle | H04L 9/12 380/2 |
| 2002/0186842 A1 | 12/2002 | Sabet-Sharghi et al. | |
| 2003/0046563 A1* | 3/2003 | Ma | G06F 21/72 713/190 |
| 2004/0181800 A1* | 9/2004 | Rakib | H04L 63/062 725/25 |
| 2005/0180568 A1* | 8/2005 | Krause | H04N 21/23608 380/212 |
| 2005/0210287 A1* | 9/2005 | Paatero | G06F 21/14 726/5 |
| 2006/0095535 A1* | 5/2006 | Govindaraju | H04L 47/10 709/217 |
| 2007/0244993 A1* | 10/2007 | Volodarsky | H04L 67/02 709/219 |
| 2007/0258586 A1* | 11/2007 | Huang | H04N 5/913 380/201 |
| 2008/0062991 A1* | 3/2008 | Kumar | H04L 49/90 370/392 |
| 2008/0229425 A1* | 9/2008 | Perrin | G06F 21/6209 726/26 |
| 2009/0141385 A1* | 6/2009 | Tashiro | G11B 19/041 360/31 |
| 2009/0161632 A1* | 6/2009 | Palenius | H04W 52/262 370/335 |
| 2010/0250926 A1* | 9/2010 | Ji | G06F 21/10 713/165 |
| 2011/0064220 A1* | 3/2011 | Chen | H04N 7/1675 380/217 |
| 2011/0129087 A1* | 6/2011 | Zhang | G06F 21/10 380/44 |
| 2011/0191587 A1* | 8/2011 | Tian | H04L 9/32 713/168 |
| 2011/0191600 A1 | 8/2011 | Sabet-Sharghi et al. | |
| 2011/0208875 A1* | 8/2011 | Hasson | G06F 1/3203 709/238 |
| 2011/0246722 A1* | 10/2011 | Taha | G06F 12/0862 711/137 |
| 2012/0007927 A1 | 1/2012 | Nakayama | |
| 2012/0020474 A1* | 1/2012 | Kudoh | G11B 20/00282 380/28 |
| 2012/0051371 A1* | 3/2012 | Sarashina | H04J 3/1694 370/468 |
| 2012/0096223 A1* | 4/2012 | Castelloe | G06F 1/3275 711/118 |
| 2012/0226915 A1* | 9/2012 | Zollinger | G06F 21/10 713/193 |
| 2012/0278543 A1* | 11/2012 | Yu | G06F 3/0604 711/103 |
| 2013/0003863 A1* | 1/2013 | Hutchings | H04N 21/4183 375/240.25 |
| 2013/0304967 A1* | 11/2013 | Hanafusa | G06F 12/0246 711/103 |
| 2014/0037090 A1 | 2/2014 | Nicholls | |
| 2014/0068704 A1* | 3/2014 | Grewal | H04L 63/0428 726/1 |
| 2014/0201770 A1* | 7/2014 | Schraga | G11B 27/036 725/14 |
| 2015/0029784 A1* | 1/2015 | Yabuuchi | G11C 11/417 365/154 |
| 2015/0154121 A1* | 6/2015 | Schmier | G06F 12/1408 713/193 |
| 2015/0237645 A1* | 8/2015 | Andrianov | H04W 72/1215 370/329 |
| 2015/0288593 A1* | 10/2015 | Campbell | H04L 43/16 709/224 |

FOREIGN PATENT DOCUMENTS

| | | |
|---|---|---|
| KR | 10-2004-0000323 | 1/2004 |
| KR | 10-2006-0116967 | 11/2006 |
| WO | 2008/089146 | 7/2008 |

OTHER PUBLICATIONS

European Office Action dated Feb. 13, 2018 in corresponding European Patent Application No. 15 187 724.8, 6 pgs.
Chinese Office Action dated Dec. 18, 2017 in corresponding Chinese Patent Application No. 201510644689.6, 19 pgs.
European Office Action dated Dec. 14, 2018 from European Patent Application No. 15187724.8, 8 pages.
European Office Action dated May 24, 2017 in related European Patent Application No. 15187724.8 (6 pages).

* cited by examiner

IMAGE PROCESSING APPARATUS AND CONTROL METHOD FOR RECEIVING AND PROCESSING ENCRYPTED IMAGE SIGNALS

CROSS-REFERENCE TO RELATED APPLICATIONS

This application claims the priority benefit of Korean Patent Application No. 10-2014-0133237, filed on Oct. 2, 2014 in the Korean Intellectual Property Office, the disclosure of which is incorporated herein by reference.

BACKGROUND

1. Field

Apparatuses and methods consistent with exemplary embodiments relate to an image processing apparatus capable of processing a video stream to be displayed as an image and a control method thereof, and more particularly to an image processing apparatus, in which, when a video stream of content data protected by digital rights management (DRM) is decrypted and displayed as an image, the decrypted content data is prevented from leakage (from being compromised) due to hacking, and a control method thereof.

2. Description of the Related Art

An image processing apparatus processes an image signal/video data received from the exterior in accordance with various video processing processes. The image processing apparatus may display an image based on the processed video data on its own display panel, or output the processed image signal to another display apparatus provided with a panel so that on the corresponding display apparatus can display an image based on the processed image signal. That is, the image processing apparatus may include the panel capable of displaying an image or include no panel as long as it can process the video data. For example, the former may include a television (TV), and the latter may include a set-top box.

With development of technology, content data of high resolution and ultra-high definition (UHD) has been provided to the image processing apparatus through analog/digital communication. Such content data may be allowed to be copied/duplicated freely, or its copyright may be protected by digital rights management (DRM). The DRM may be achieved in various forms, and is basically provided to prevent an unauthorized third party from duplicating content data of the image processing apparatus without permission. For example, a content provider provides the content data encrypted by the DRM technology to the image processing apparatus, and the image processing apparatus decrypts the content data with a secret key for decryption so that an image can be displayed based on the decrypted content data. The image processing apparatus cannot display an image of the encrypted content data without the secret key.

The image processing apparatus has to prevent content data, to which the DRM is applied, from being duplicated and leaking to an external apparatus whereas the corresponding content data is allowed to be decoded in the image processing apparatus and displayed as an image. However, if any restriction is not set to operations of internal configurations of the image processing apparatus, it is impossible to prevent the content data from leaking to the exterior. Accordingly, the image processing apparatus may need a configuration and design for protecting the content data.

SUMMARY

In an aspect of one or more embodiments, there is provided an image processing apparatus which may include: a signal receiver configured to receive an encrypted image signal; a storage configured to temporarily store the encrypted image signal received in the signal receiver; a signal decryptor configured to convert the encrypted image signal into a decrypted image signal by decrypting the encrypted image signal output from the storage with a preset first secret key; and a decoder configured to decode the decrypted image signal output from the signal decryptor for display of an image based on the decoded decrypted image signal. Thus, the decrypted image signal is prevented from being stored in the storage, thereby protecting the decrypted image signal from leaking without permission due to hacking to the CPU or the storage and tightening content security.

The image processing apparatus may further include a central processing unit (CPU), wherein the storage stores data to be processed by the CPU. The storage for storing the encrypted image signal is materialized in the storage area of the RAM to be used by the CPU, thereby simplifying design of the image processing apparatus and reducing production costs.

The image processing apparatus may further include a demultiplexer configured to demultiplex the encrypted image signal received in the signal receiver. Thus, if the received image signal is a multiplexed transport stream, it is separated into sub-streams corresponding to respective decoders and then stored in the storage.

The CPU may be configured to extract the first secret key from the encrypted image signal received in the signal receiver, and may store the extracted first secret key in a register to which the signal decryptor can have access.

The CPU may be configured to delete the first secret key from the register when decryption of the encrypted image signal is completed. The secret key is present only at the encryption, but otherwise not present in the image processing apparatus, so that the secret key can be prevented from leaking, thereby eventually protecting the decrypted image signal.

The image processing apparatus may further include a controller configured to store the encrypted image signal received by the signal receiver in the storage, and may be configured to transmit the stored image signal from the storage to the signal decryptor as much as a data amount requested by the decoder. Thus, it is possible to control input/output of the image signal to/from the storage.

The controller may be configured to transmit the image signal stored in the storage to the decoder by bypassing the signal decryptor if the image signal stored in the storage is not encrypted. Thus, if the transport stream includes both the scrambled sub-stream and the not-scrambled sub-stream, the sub-streams may be transmitted to the decoders in accordance with their states.

The controller may delete the encrypted image signal, which is transmitted to the signal decryptor, from the storage. Thus, an area for storing the encrypted image signal transmitted in the next is secured in the storage.

The image processing apparatus may further include: an encryptor configured to encrypt the decrypted image signal output from the signal decryptor with a preset second secret key; and another storage configured to store the image signal encrypted again by the encryptor. The second secret key may be generated based on unique identification information of the image processing apparatus. Thus, a user of the image processing apparatus can record and store the decrypted image signal while the decrypted image signal is prevented from leaking in the future.

In an aspect of one or more embodiments, there is provided a method of controlling an image processing apparatus, the method may include: receiving an encrypted image signal; temporarily storing the encrypted image signal in a storage; converting the encrypted image signal into a decrypted image signal by decrypting the encrypted image signal stored in the storage with a preset first secret key; and decoding the decrypted image signal for display of an image based on the decoded decrypted image signal. Thus, the decrypted image signal is prevented from being stored in the storage, and thus the protected from leaking without permission against hacking to the CPU or the storage, thereby tightening content security.

The storage may store data to be processed by a central processing unit (CPU) of the image processing apparatus. The storage for storing the encrypted image signal is provided in the storage area of the RAM to be used by the CPU, thereby simplifying design of the image processing apparatus and reducing production costs.

The receiving of the encrypted image signal may further include demultiplexing the encrypted image signal. Thus, if the received image signal is a multiplexed transport stream, it is separated into sub-streams corresponding to respective decoders and then stored in the storage.

The converting of the encrypted image signal into the decrypted image signal may include extracting the first secret key from the encrypted image signal; and storing the extracted first secret key, accessed by the CPU for the encryption, in a register. The converting the encrypted image signal into the decrypted image signal may further include deleting the first secret key from the register when decryption of the encrypted image signal is completed. The secret key is present only at the encryption, but otherwise not present in the image processing apparatus, so that the secret key can be prevented from leaking, thereby eventually protecting the decrypted image signal.

The method may further include encrypting the decrypted image signal with a preset second secret key; and storing the re-encrypted image signal. The second secret key may be generated based on unique identification information of the image processing apparatus. Thus, a user of the image processing apparatus can record and store the decrypted image signal while the decrypted image signal is prevented from leaking in the future.

In an aspect of one or more embodiments, there is provided at least one non-transitory computer readable medium storing computer readable instructions which when executed implement methods of one or more embodiments.

In an aspect of one or more embodiments, the image processing apparatus may be incorporated into any one of a television, a monitor, a tablet, a mobile phone, an electronic blackboard, an electronic picture frame, an electronic billboard, a set-top box, and an optical media player.

In an aspect of one or more embodiments, there is provided an image processing apparatus which may include a signal receiver configured to receive a scrambled transport stream; a central processing unit configured to extract a secret key from the scrambled transport stream and to store the secret key in a register; a demultiplexer configured to separate a scrambled video stream from the scrambled transport stream; a controller configured to receive the scrambled video stream from the demultiplexer; a storage including a buffer configured to receive the scrambled video stream from the controller; a video decoder configured to request the controller to control transmission of the scrambled video stream stored in the buffer for descrambling and decoding of the scrambled video stream; a descrambler configured to receive the scrambled video from the buffer by way of the controller transmitting the scrambled video stream from the buffer in response to the request of the decoder, and configured to descramble the scrambled video stream using the secret key stored in the register to generate a clean video stream; and a video decoder configured to receive the clean video stream and to decode the clean video stream for display of a video based on the decoded descrambled video stream.

The demultiplexer may be configured to separate a scrambled audio stream from the scrambled transport stream. The controller may be configured to receive the scrambled audio stream from the demultiplexer. The storage may include a buffer which is configured to receive the scrambled audio stream from the controller.

The image processing apparatus may further include an audio decoder configured to request the controller to control transmission of the scrambled audio stream stored in the buffer for descrambling and decoding of the scrambled audio stream; a descrambler configured to receive the scrambled audio from the buffer by way of the controller transmitting the scrambled audio stream from the buffer in response to the request of the decoder to descramble and decode the scrambled audio stream, and configured to descramble the scrambled audio stream using the secret key stored in the register to generate a clean audio stream; and an audio decoder configured to receive the clean audio stream and to decode the clean audio stream.

The central processing unit may be configured to extract another secret key from the scrambled transport stream and to store the another secret key in another register.

The image processing apparatus may further include an audio decoder configured to request the controller to control transmission of the scrambled audio stream stored in the buffer for descrambling and decoding of the scrambled audio stream; a descrambler configured to receive the scrambled audio from the buffer by way of the controller transmitting the scrambled audio stream from the buffer in response to the request of the decoder to descramble and decode the scrambled audio stream, and configured to descramble the scrambled audio stream using the another secret key stored in the another register to generate a clean audio stream; and an audio decoder configured to receive the clean audio stream and decode the clean audio stream.

In an aspect of one or more embodiments, there is provided an image processing apparatus which may include a signal receiver configured to receive a scrambled transport stream including a secret key and a scrambled video stream; a storage controller; a storage including a buffer configured to receive the scrambled video stream; a video decoder configured to request the storage controller to control transmission of the scrambled video stream stored in the buffer for descrambling and decoding of the scrambled video stream; a descrambler configured to receive the scrambled video from the buffer by way of the storage controller transmitting the scrambled video stream from the buffer in response to the request of the decoder, and configured to descramble the scrambled video stream using the secret key to generate a clean video stream; and a video decoder configured to receive the clean video stream and decode the clean video stream for display of a video based on the decoded descrambled video stream.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Below, exemplary embodiments will be described in detail with reference to accompanying drawings. The following descriptions of exemplary embodiments are made by referring to elements shown in the accompanying drawings, in which like numerals refer to like elements having substantively the same functions.

In the description of exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, exemplary embodiments will describe elements directly related to aspects of exemplary embodiments, and description of the other elements will be omitted. However, it will be appreciated that the elements, the descriptions of which are omitted, are not unnecessary to realize the apparatus or system according to exemplary embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Figure 1:
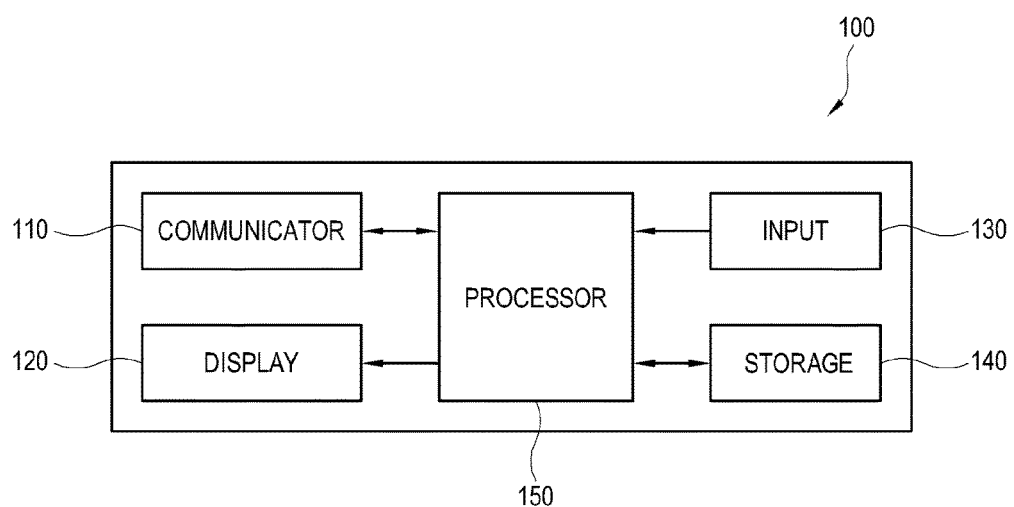
FIG. 1 shows an example of an image processing apparatus according to an exemplary embodiment.

FIG. 1 shows an example of an image processing apparatus 100 according to an exemplary embodiment;

As shown in FIG. 1, the image processing apparatus 100 is a display apparatus with a display 120 capable of displaying an image by itself, and may include a television (TV). However, the image processing apparatus 100 may be achieved not only by the display apparatus with the display 120 but also in the form of having no display. For example, the former may include the TV, a monitor, a tablet, a mobile phone, an electronic blackboard, an electronic picture frame, an electronic billboard, etc., and the latter may include a set-top box, an optical multimedia player, etc. Besides, the image processing apparatus 100 may be achieved in various forms. For instance, the image processing apparatus 100 may be applied to both a stationary form to be stationarily installed and used in one place and a mobile form to be freely carried and used by a user.

The image processing apparatus 100 receives a broadcast signal or the like video data/an image signal/a video stream received from the exterior, and processes it in accordance with preset processes, thereby displaying an image on the display 120. If the image processing apparatus does not have the display 120, the image processing apparatus 100 transmits the video stream to another display apparatus (not shown) so that an image can be displayed on the display apparatus (not shown).

The image processing apparatus 100 includes a communicator 110 which exchanges a signal/data with the exterior, the display which displays an image based on data if the data received in the communicator 110 is a video stream, an input 130 which receives a user's input, a storage 140 which stores data, and a processor 150 which controls general operations of the image processing apparatus 100 and processes the data processor 150.

The communicator 110 transmits and receives data locally or through a network so that the display apparatus 100 can interactively communicate with the exterior. For example, the communicator 110 connects with an external device (not shown) through wired/wireless wide region network in accordance with preset communication protocols. The communicator 110 may be achieved by a connection port based on communication standards or a set of connection modules, and therefore the protocol for connection or an external device (not shown) to be connected is not limited to one kind or type. The communicator 110 may be built in the display apparatus 100, or the whole or some elements of the communicator 110 may be additionally installed in the form of add-on or dongle in the display apparatus 100.

The communicator 110 may transmit and receive a signal based on individual communication protocols with respect to respective connected devices. In the case of the video data, the communicator 110 may transmit and receive a signal based on various standards such as radio frequency (RF), composite/component video, super video, Syndicat des Constructeurs d'Appareils Radiorécepteurs et Téléviseurs (SCART), high definition multimedia interface (HDMI), DisplayPort, unified display interface (UDI), wireless high definition (HD), etc.

The communicator 110 may receive both an analog signal and a digital signal, and include modules for the analog and digital signals. For example, the communicator 110 may include a tuner (not shown) for selecting a broadcast signal, i.e., a video stream received in an antenna through a radio frequency (RF) method, an Ethernet module (not shown) for receiving digital packet data with regard to a network such as Internet or the like, etc.

The display 120 displays an image based on the video stream processed by the processor 150. The display 120 may for example be achieved by liquid crystal, plasma, a light emitting diode (LED), an organic light-emitting diode (OLED), a surface-conduction electron-emitter, a carbon nano-tube (CNT), nano-crystal, or the like various displays, without limitation.

The display 120 may include additional elements in accordance with its types. For example, if the display 120 is achieved by the liquid crystal, the display 130 includes a liquid crystal display (LCD) panel (not shown), a backlight unit (not shown) for emitting light to the LCD panel, and a panel driver (not shown) for driving the LCD panel (not shown).

The input 130 sends the processor 150 a variety of preset control commands or information in response to a user's operation or inputs. The input 130 informationizes various events generated by control of a user corresponding to his/her intention and transmits the event information to the processor 150. The input 130 may be achieved in various forms for generating the information input by a user. For example, the input 130 may include a key/a button installed outside the image processing apparatus 100, a remote controller provided remotely and separately from a main body of the image processing apparatus 100 and communicating with the communicator 110, or a touch screen integrated with the display 120.

The storage 140 stores a variety of data under process and control of the processor 150. The storage 140 is achieved by a flash-memory, a hard-disc drive or the like nonvolatile memory to preserve data regardless of supply of system power. The storage 140 is accessed by the processor 150 and performs reading, writing, editing, deleting, updating or the like with regard to data.

The processor 150 performs various processes to data/a signal received in the communicator 110. If the video stream is received in the communicator 110, the processor 150 performs a video processing process to the video stream and outputs the processed video stream to the display 120, thereby allowing the display 120 to display an image based on the video stream.

There is no limit to the kind of video processing process performed by the processor 150, and the video processing process may for example include demultiplexing for separating an input stream into sub-streams of video, audio and additional data, decoding to be performed corresponding to image formats of a video stream, de-interlacing for converting a video stream from an interlaced type into a progressive type, scaling for adjusting the video stream to have a preset resolution, noise reduction for improving image quality, detail enhancement, frame refresh rate conversion, etc.

The processor 150 may perform various processes in accordance with the kind and properties of data, and therefore the process of the processor 150 is not limited to the foregoing video processing processes. Further, the data that can be processed by the processor 150 is not limited to the foregoing data received in the communicator 110. For example, if a user's speech is input to the image processing apparatus 100, the processor 150 may process the speech in accordance with a preset audio processing process. The processor 150 may be achieved in the form of a system-on-chip (SoC) where various functions corresponding to such many processes are integrated, or an image processing board where individual chip-sets for independently performing the respective processes are mounted to a printed circuit board. Thus, the processor 150 may be built in the image processing apparatus 100.

Below, details of the processor 150 will be described with reference to FIG. 2.

Figure 2:
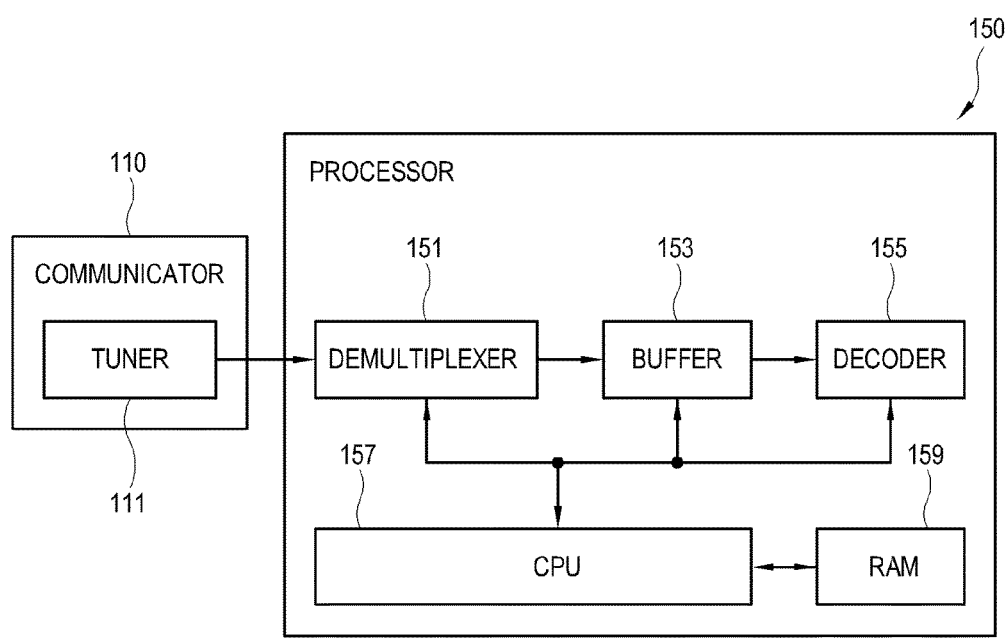
FIG. 2 is a block diagram of a processor in the image processing apparatus of FIG. 1.

FIG. 2 is a block diagram of the processor 150. The processor 150 shown in FIG. 2 includes only the elements directly related to this exemplary embodiment. In practice, the processor 150 may include other elements in addition to the elements described in this exemplary embodiment.

As shown in FIG. 2, the processor 150 includes a demultiplexer 151 which separates a transport stream from the tuner 111 of the communicator 110 into sub-streams and respectively outputs the sub-streams, a buffer 153 in which the respective sub streams output from the demultiplexer 151 are temporarily stored, a decoder 155 which decodes the respective sub-streams temporarily stored in the buffer 153, a central processing unit (CPU) 157 which performs computing and controlling for operations of the processor 150, and a random access memory (RAM) 159 to which data computed by the CPU 157 is loaded.

For example, if a radio frequency (RF) broadcast signal is received in an external antenna (not shown), the tuner 111 is tuned to a certain channel and outputs a transport stream by converting the RF broadcast signal. The tuner 111 includes a channel decoder and an analog/digital (A/D) converter so as to convert and output an analog signal into a digital transport stream.

The demultiplexer (or deMUX) 151 basically plays an opposite role to a multiplexer (not shown). That is, the demultiplexer 151 connects one input terminal with a plurality of output terminals, and thus outputs and distributes the stream from the input terminal to each output terminal in accordance with a selection signal. For example, if there are four output terminals with regard to one input terminal, four output terminals may be respectively selected by combinations of two selection signals each of which has a state of '0' or '1'.

In addition to the foregoing function, the demultiplexer 151 installed in the image processing apparatus 100 separates the transport stream received from the tuner 111 into the sub-streams, i.e., a video stream, an audio stream, a supplementary stream, etc., and outputs them to the output terminals, respectively.

The demultiplexer 151 separates the transport stream into the respective sub-streams in accordance with packet identifiers (PID) respectively given to packets in the transport stream. The transport stream is generated by independently compressing the streams corresponding to the respective channels into packets and multiplexing these packets. When the transport stream is generated, one PID is given to a packet corresponding to a certain channel and thus distinguished from a packet of another channel. The demultiplexer 151 classifies the packets of the transport stream in accordance with PIDs, and thus extracts the sub-streams having the same PID.

The buffer 153 is a kind of temporary memory, in which each sub-stream output from the demultiplexer 151 is temporarily stored before being input to the decoder 155. The sub-stream stored in the buffer 153 is called by and input to the decoder 155, and then the called sub-stream is deleted from the buffer 153. Instead, a new sub-stream output from the demultiplexer 151 is stored in the buffer 153.

The reason why the sub-stream output from the demultiplexer 151 is not directly input to the decoder 155 but temporarily stored in the buffer 153 and input to the decoder 155 by the call of the decoder 155 is as follows.

The elements of the image processing apparatus 100, such as the demultiplexer 151 and the decoder 155, basically operate in accordance with system clocks of the image processing apparatus 100 itself. The demultiplexer 151 and the decoder 155 respectively output a certain amount of data streams per unit time. However, the amount of data stream to be input to the decoder 155 per unit time is not constant. Therefore, the decoder 155 cannot normally process the streams output from the demultiplexer 151 without the buffer 153. That is, to transmit the stream, the buffer 153 is essential in a step before the stream is input to the decoder 155.

In addition, the reason why the amount of data stream to be input to the decoder 155 per unit time is not constant is related to the materialization of the stream, and details of which will be described later.

The decoder 155 processes the streams output from the demultiplexer 151 and temporarily stored in the buffer 153. For example, if the video stream and the audio stream are output from the demultiplexer 151, they are first stored in the buffer 153. The streams to be processed is called from the buffer 153 to the decoder 155 and processed and output by the decoder 155. Since the streams encoded by a certain format are called, the decoder 155 reverses the encoding process for the stream, thereby performing a decoding process where the streams are back to a former state before the encoding process.

In this exemplary embodiment, there is provided one decoder 155 which may have a plurality of input and output terminals for respectively processing the streams. Alternatively, there may be provided decoders corresponding to the streams, respectively.

The CPU 157 is to perform central computing for operating general elements in the processor 150, and basically plays a central role in analyzing and computing the data. The CPU 157 internally includes a processor register (not shown) in which commands to be processed are stored; an arithmetic logic unit (ALU, not shown) which is in charge of comparison, determination and computation; a control unit (not shown) which internally controls the CPU 157 to analyze and correctly execute the command; an internal bus (not shown); a cache (not shown); and the like. Further, the CPU 157 communicates with the RAM 159 to which data to be processed is loaded.

The RAM 159 is loaded with data to be processed by the CPU 157. The RAM 159 includes a volatile memory (not shown) to be loaded with data, and a RAM controller (not shown) to control the volatile memory (not shown). Under control of the CPU 157, the RAM controller (not shown) loads new data in the RAM 159 or calls the data loaded in the RAM 159 to the CPU 157.

With this structure, the operations of the processor 150 for processing the transport stream will be described. The tuner 111 receives an RF broadcast signal and outputs a digital transport scream. The demultiplexer 151 separates the transport stream into the sub-streams of the video stream and the audio stream, and respectively outputs these streams to the buffers 153 at a constant rate.

The video stream and the audio stream stored in the buffer 153 are input from the buffer 153 to the decoder 155 in response to a call of the decoder 155. The amount of data stream called by the decoder 155 is dependent on the process of the decoder 155 at a corresponding point of time, and is thus not constant per unit time.

The decoder 155 processes the video stream and the audio stream and outputs them at respective constant rates. The output video streams are materialized as an image in the display 120 (refer to FIG. 1), and the output audio streams materialized as a sound through a loudspeaker (not shown) or the like.

According to this exemplary embodiment, the buffer 153 and the RAM 159 are provided separately. The buffer 153 and the RAM 159 may be respectively achieved by volatile memories so as to temporarily store the data. The buffer 153 and the RAM 159 respectively provided as separate hardware memories relatively increases a manufacturing cost of the processor 150 and makes a circuit structure of the processor 150 complicated. Therefore, if the buffer 153 is provided as a partial storage area of the RAM 159 rather than a separate hardware element, it is possible to relatively simplify the structure and reduce the manufacturing cost.

Figure 3:
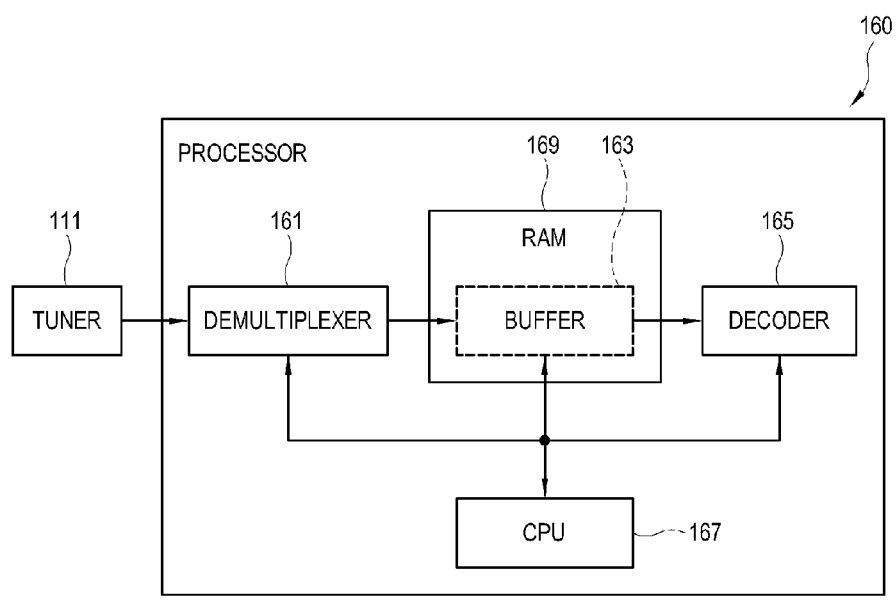
FIG. 3 is a block diagram of a processor according to an exemplary embodiment.

FIG. 3 is a block diagram of a processor 160 according to an exemplary embodiment. In this exemplary embodiment, the processor 160 may replace the processor 150 of FIG. 2 and be used for the image processing apparatus 100 of FIG. 1.

As shown in FIG. 3, the processor 160 includes a demultiplexer 161, a buffer 163, a decoder 165, a CPU 167, and a RAM 169. Like the foregoing exemplary embodiment, the demultiplexer 161 separates the transport stream output from the tuner 111 into the sub-streams and temporarily stores the sub-streams in the buffer 163, and the decoder 165 calls and decodes the sub-streams temporarily stored in the buffer 163. The CPU 167 controls such processes and performs necessary operations.

In contrast with an exemplary embodiment shown in FIG. 2, the buffer 163 according to this exemplary embodiment is not a memory separated from the RAM 169 but a partial storage area of the RAM 169. The buffer 163 may be achieved by static allocation in which a preset address range of a storage area in the RAM 169 is used, or by dynamic allocation in which a necessary size of the buffer 163 is varied. In any case, the buffer 16 uses the storage area of the RAM 169. Since the RAM 169 and the buffer 163 are materialized as a single hardware memory, it is more possible to simplify the structure and reduce the manufacturing cost than the foregoing exemplary embodiment in which they are materialized as separate hardware elements.

In exemplary embodiments shown in FIG. 2 and FIG. 3, the image processing apparatus 100 processes the transport stream to which particular security is not applied. However, the transport stream to be processed by the processor 160 may be protected by security such as DRM technology so as not to be copied without permission through the hacking. In this case, the corresponding transport stream has to be released from the security prior to the decoding process.

For example, content data for an UHD image provided by a data provider or a stream provider may include data which is encrypted by an encryption algorithm set up at the encoding process. Thus, the stream of the encrypted content data will be called a scrambled stream. Further, the scrambled stream may be decrypted by a certain secret key or decryption key, and the stream decrypted and returned to a previous stream of before undergoing the encryption process will be called a clean stream.

The encryption algorithm may include various methods. For example, there is an advanced encryption standard (AES). The AES is an encryption method that has been established by the U.S. National Institute of Standards and Technology (NIST) in 2001, and supersedes data encryption standard (DES), which was published in 1977. The AES is a 128 bit encryption algorithm, and is also a symmetric key algorithm in which the same key is used for both encrypting and decrypting the data. Basically, the AES is excellent in safety against linear cryptanalysis and differential cryptanalysis, a calculation efficiency related to processing speed and memory requirement, and a materializing characteristic of the algorithm related to flexibility and simplicity.

If the image processing apparatus 100 receives a scrambled image signal and thus the tuner 111 outputs the scrambled transport stream, the processor 160 has to decrypt and decode the scrambled transport stream so that an image can be displayed. No matter how strong the encryption algorithm is, the encryption algorithm applied to the stream by the stream provider has to be first converted into the clean stream. Therefore, if a hacker has authority to control the image processing apparatus 100, he/she is allowed to duplicate and leak the decrypted clean stream leak from the image processing apparatus 100.

In light of software, the operations of the image processing apparatus 100 are performed under an operating system OS such as Linux. A hacker uses a rootkit or the like to modify the operating system OS of the image processing apparatus 100 and thus have an authority to control the CPU 167, thereby eventually controlling the image processing apparatus 100. The rootkit is a program that is used by a hacker to acquire authority of an administrator account of the image processing apparatus 100, i.e. a root account. If the rootkit acquires the root authority, a hacker can access both software and hardware of the image processing apparatus 100.

To defend against a hacker's attack using the rootkit, in particular to protect a certain program against the rootkit, two conditions have to be satisfied.

One is to isolate the program in an area that even the operating system OS cannot access. If the operating system OS cannot access the program, it is impossible for a hacker to have an access to the corresponding program even though he/she can acquire the root authority and fake the operating system OS.

The other one is to prevent the process of executing the corresponding program from being faked. If a previous state before executing the program is not reliable, the program executed in this state is not eventually reliable even though the program is completely isolated. That is, the processes from booting up the image processing apparatus 100 to executing the program have to be reliable.

Taking these conditions into account, software security may be applied to the image processing apparatus 100. For example, ARM TrustZone technology may be applied to the image processing apparatus 100.

Figure 4:
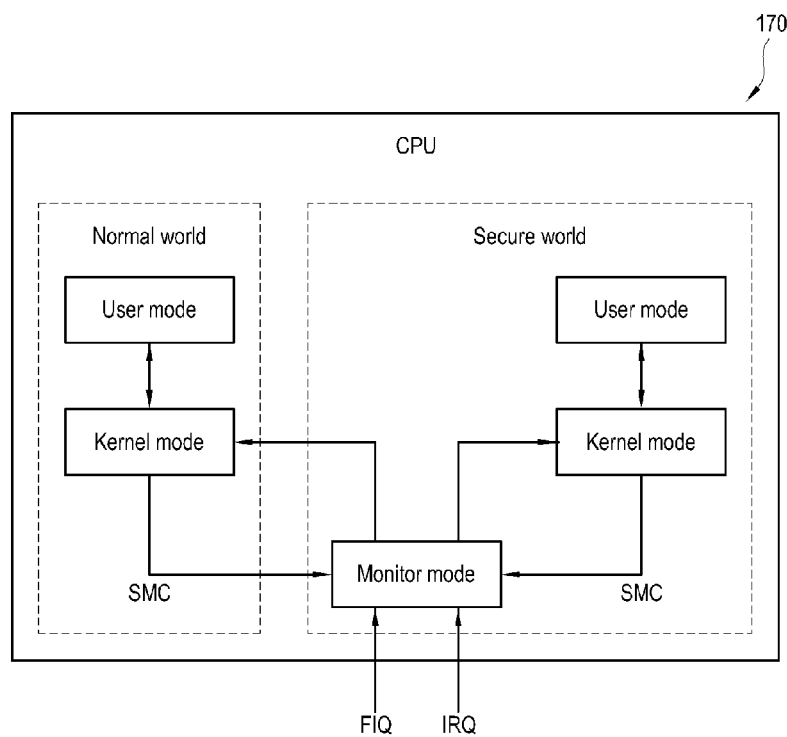
FIG. 4 is an example illustrating a principle of software security technology applicable to a central processing unit (CPU) according to an exemplary embodiment.

FIG. 4 is an example illustrating a principle of software security technology applicable to the CPU 170 according to an exemplary embodiment. In this exemplary embodiment, TrustZone will be described as the software security technology.

Referring to FIG. 4, in the TrustZone technology, a single physical processor core of the CPU 170 is divided into a normal world for a non-security zone and a secure world for a security zone. A register of the CPU 170 is divided for each world. Since the register related to a page table is separated corresponding to the respective worlds, the worlds may be different in an address of a table used in change between a virtual address and a physical address. This makes the worlds to access different address spaces, respectively. It is also possible to designate a device or a memory area to be accessible only in the secure world. In this case, if the corresponding area is accessed in the normal world, a page fault occurs. Further, interrupt may be separated into normal interrupt and secure interrupt. In the secure world, the normal interrupt does not occur. In the normal world, the secure interruption and the normal interrupt may occur.

A user mode may restrictively use the CPU 170 and therefore important functions related to the CPU 170 may be blocked off. On the other hand, a kernel mode can utilize the functions of the CPU 170, which cannot be accessed by the user mode.

Thus, the TrustZone technology can isolate the CPU, the address space, the memory and the device from one another in the respective worlds, and drive a separate operating system OS for each world. On the contrary to the multicore of the CPU 170, two worlds are not executed at the same time but switched between them.

To switch between two worlds, the TrustZone employs a monitor mode. The monitor mode is provided only in the secure world. Since entering the monitor mode means entering the secure world, the monitor mode is used for switching from the normal world to the secure world. Entering the monitor mode may be achieved when a secure monitor call (SMC) command is issued or FIQ or IRQ interrupt occurs. Further, the SMC command is executable in only the kernel mode, and it is therefore impossible to switch between the worlds in an application level.

Like this, one world cannot affect another world. In particular, the normal world cannot interrupt the execution of the secure world. Accordingly, a program generally required to have high security, i.e. high reliability against the rootkit is executed in the secure world, and other programs are executed in the normal world.

However, such software security technology cannot perfectly defend against a hacker's attack. For example, if a hacker acquires the foregoing SMC command, he/she can easily enter the secure world and access the isolated program or data. Accordingly, to defend a hacker's attack, e.g., to prevent the duplication and leakage of the stream without permission, the software security technology has to be improved. For example, it will be preferable if security technology isolates and processes the stream by hardware, and details of this will be described later.

Below, an embodiment of decrypting and decoding the scrambled transport stream into the clean stream will be described with reference to FIG. 5.

Figure 5:
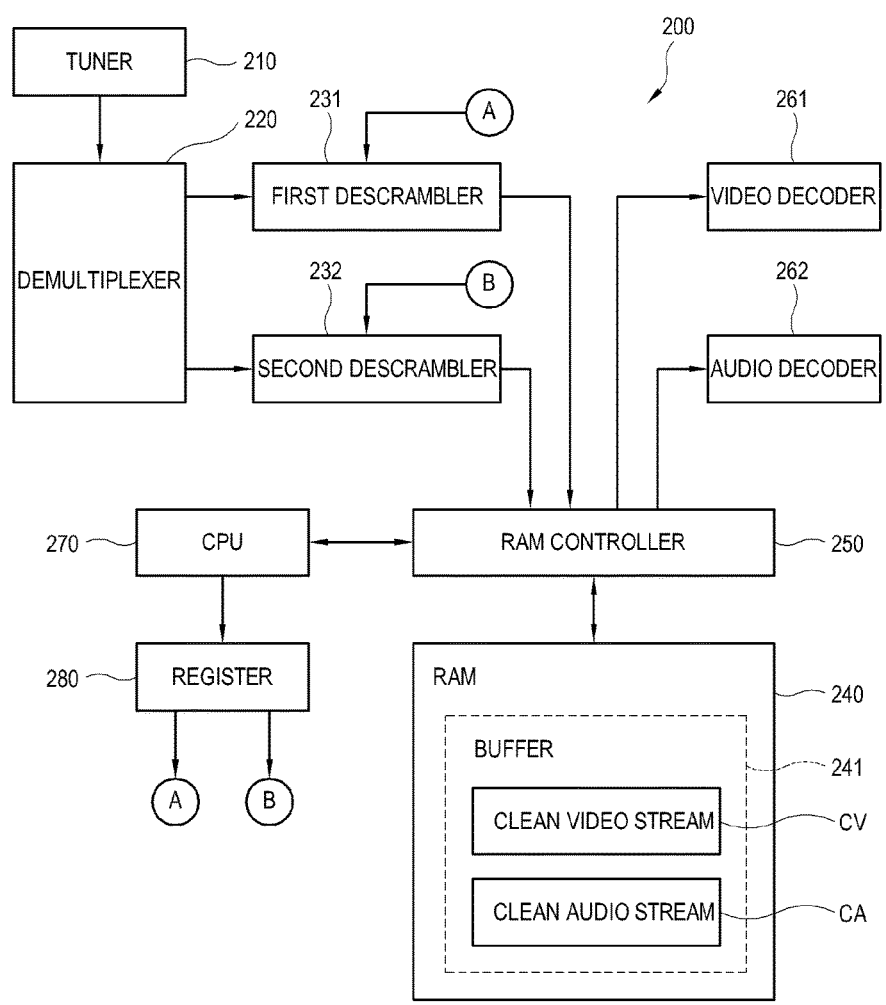
FIG. 5 is a block diagram of a processor according to an exemplary embodiment.

FIG. 5 is a block diagram of a processor 200 according to an exemplary embodiment.

As shown in FIG. 5, the processor 200 includes a demultiplexer 220 which extracts and outputs a scrambled video stream and a scrambled audio stream from a scrambled transport stream of a tuner 210; a first descrambler 231 which decrypts the scrambled video stream from the demultiplexer 22 into a clean video stream CV; a second descrambler 232 which decrypts the scrambled audio stream from the demultiplexer 220 into a clean audio stream CA; a RAM 240; a buffer 241 which is formed in the RAM 240 and temporarily stores the clean video stream CV and the clean audio stream CA; a RAM controller 250 which controls input/output of a stream in the RAM 240 and the buffer 241; a video decoder 261 which decodes the clean video stream CV from the buffer 241; an audio decoder 262 which decodes the clean audio stream CA from the buffer 241; a CPU 270; and a register 280 which records data from the CPU 270 and sends the corresponding data to the first descrambler 231 and the second descrambler 232 as necessary.

In this exemplary embodiment, the basic structure of the processor 200 conforms to that shown in FIG. 3. That is, the buffer 241 is formed in the storage area of the RAM 240. However, this exemplary embodiment considers that two sub-streams of the video stream and the audio stream are extracted from the transport stream, and discloses the descramblers 231 and 232 for decrypting the scrambled transport streams, and a RAM controller 250 for controlling the input/output of the RAM 240 and the buffer 241.

If the tuner 210 outputs the scrambled transport stream, the demultiplexer 220 extracts the scrambled video stream and the scrambled audio stream from the scrambled transport stream. The demultiplexer 220 outputs the scrambled video stream to the first descrambler 231, and outputs the scrambled audio stream to the second descrambler 232.

The first descrambler 231 decrypts the scrambled video stream with a preset secret key and generates the clean video stream CV. The first descrambler 231 reads the secret key from the register 280.

The second descrambler 232 decrypts the scrambled audio stream with a preset secret key and generates the clean audio stream CA. The second descrambler 232 reads the secret key from the register 280. In an exemplary embodiment, the secret key used by the first descrambler 231 may be the same as or different from the secret key used by the second descrambler 232. This may be set when the stream provider firstly generates the stream.

The secret key is not present in the image processing apparatus 100 until the tuner 210 first outputs the scrambled transport stream. If the secret key has been stored in a certain memory of the image processing apparatus 100, the secret key may leak to a hacker when the hacker acquires authority to control the image processing apparatus 100. Thus, the secret key is present in the image processing apparatus 100 after the scrambled transport stream is first output from the tuner 210, and is not present in the image processing apparatus 100 when the corresponding transport stream is completely processed or no longer performed.

Accordingly, the secret key is given as follows. The scrambled transport stream output from the tuner 210 is sent to the CPU 270. The scrambled transport stream contains the secret key first encrypted by the stream provider. Although general packet analysis is applied to the scrambled transport stream, the encrypted secret key is not decrypted.

When the scrambled transport stream is output from the tuner 210, the CPU 270 executes DRM software previously installed in the image processing apparatus 100 in order to decrypt the secret key. The CPU 270 uses the DRM software to analyze the scrambled transport stream, thereby extracting the secret key from the scrambled transport stream. The CPU 270 records the extracted secret key in the register 280 so as to be referred to by the first descrambler 231 and the second descrambler 232.

Then, when the tuner 210 no longer output the transport stream of the same content data, the CPU 270 deletes the secret key recorded in the register 280, thereby securing the secret key against the leakage in the future.

The first descrambler 231 and the second descrambler 232 transmit the clean video stream CV and the clean audio stream CA to the RAM controller 250. The RAM controller 250 stores the clean video stream CV and the clean audio stream CA in the buffer 241 provided in the RAM 240.

The video decoder 261 makes a request for a packet of the clean video stream CV to be processed to the RAM controller 250. The RAM controller 250 acquires the packet from the buffer 241 in accordance with the request of the video decoder 261 and transmits the packet to the video decoder 261. The video decoder 261 decodes the received packet.

Like the video decoder 261, the audio decoder 262 also decodes the packet of the clean audio stream CA received from the RAM controller 250.

Through these processes, the scrambled transport stream is processed and displayed as an image.

Below, that the clean video stream CV is stored in the buffer 241 and then input to the video decoder 261 will be described with reference to FIG. 6.

Figure 6:
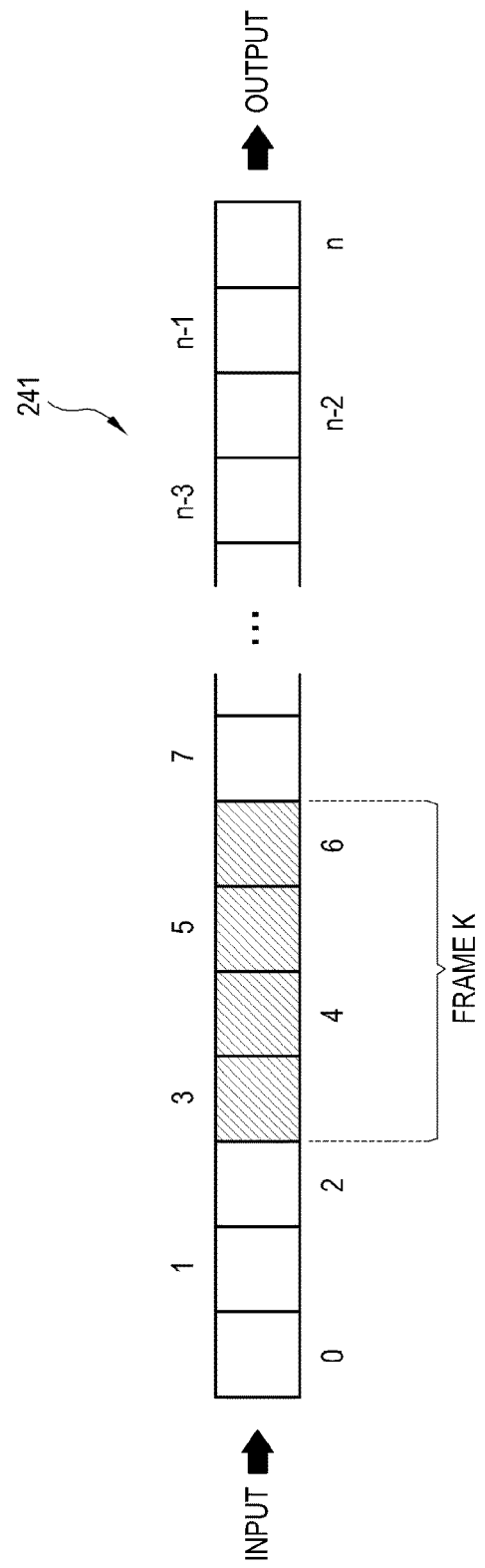
FIG. 6 is an example illustrating a principle that a RAM controller in the processor of FIG. 5 stores a video stream in a buffer.

FIG. 6 is an example illustrating a principle that a RAM controller 250 stores a video stream in the buffer 241.

As shown in FIG. 6, the storage area of the buffer 241 may be divided into storage addresses from '0' to 'n', where n is a positive integer. To store the clean video stream CV output from the first descrambler 231, the RAM controller 250 divides the packets of the clean video stream CV in accordance with preset units of processing. Such a unit of processing refers to the amount of packet data called once by the video decoder 261. For example, the unit of processing may include a unit of frame, a unit of field, or a unit of preset section within the frame. However, as described above, the amount of data called by the video decoder 261 in a unit of time or the amount of data called per call times is not uniform but varied depending on processes. Therefore, such a unit of processing is varied depending on processes.

For example, if a packet of a frame 'k' in the clean video stream CV is received, the RAM controller 250 stores the packet of the frame 'k' in an empty area, in which the packet is not stored, within the buffer 241. In this exemplary embodiment, the frame 'k' is stored in the address area from '3' to '6' of the buffer 241. Further, the RAM controller 250 records that the frame 'k' is stored in the address area from '3' to '6' of the buffer 241, where 'k' is a positive integer.

Then, if the video decoder 261 makes a request for the packet corresponding to the frame 'k', the RAM controller 250 retrieves a recorded history and searches an address of the buffer 241 in which the packet of the frame 'k' is stored. The RAM controller 250 reads the packet stored in the address area from '3' to '6' of the buffer 241 in accordance with search results, transmits the packet to the video decoder 261, and deletes the packet from the corresponding address area.

By the way, the processor 200 having such a descrambling structure may have problems in the following situations.

In this exemplary embodiment, the storage area of the RAM 240 is used as the buffer 241 as shown in FIG. 5. Since the CPU 270 is allowed to access the RAM 240, data loaded to the RAM 240 may leak to a hacker who acquires authority to control the CPU 270. Although the TrustZone technology is applied as previously described with reference to FIG. 4, it is impossible to protect the data loaded to the RAM 240 from a hacker as long as the hacker acquires the SMC command and enters the secure world.

In this exemplary embodiment, the decrypted clean video (CV) and clean audio stream (CA) are loaded to the RAM 240. Therefore, if a hacker controls the CPU 270 to access the RAM 240, the decrypted clean video (CV) and clean audio stream (CA) directly leak to him/her.

Accordingly, hardware security technology improved in isolating the data, i.e. physically isolating the data is required rather than software security technology. The hardware security technology will be described later.

The foregoing exemplary embodiment referring to FIG. 2 describes that the stream output from the demultiplexer is not directly input to the decoder and thus the buffer is needed for temporarily storing the stream before the stream is input to the decoder. Further, the buffer is necessary because the data amount of stream to be input to the decoder per unit of time is not uniform. The reason why the data amount of stream to be input to the decoder is not uniform is related to the materializing characteristic of the stream. Below, the reason will be described in more detail.

As a principle of compressing video content data by a certain format to generate the video stream, there are a spatial redundancy compression method, a temporal redundancy compression method, and a statistical redundancy compression method.

The spatial redundancy compression method uses discrete cosine transform (DCT) based on similarity between backward and forward adjacent frames of the video stream. For example, the data of the previously received stream is continuously used with regard to a little changed portion in a scene of an image, such as a studio set, an unchanged background, etc., and partial data is received with regard to only a changed portion, thereby reducing the amount of information to be transmitted.

The temporal redundancy compression method is as follows. In a moving image which contains motion of a frame unit like a movie, image information is similar between a previous frame and a following frame. In this case, the temporal redundancy compression method does not send a new image but uses the previous image again. That is, a still image is continued until a scene is changed, thereby omitting frames which correspond to temporarily redundancy.

The statistical redundancy compression method is as follows. Probability is determined with respect to information that frequently occurs, and the number of bits is determined based on this probability. Based on a Huffman code compression method, the statistical redundancy compression method uses a code table, in which a small bit is allocated to a frequent code, thereby compressing and transmitting the information without any loss.

With these principles, video compression standards of moving picture experts group (MPEG) will be described by way of example among various compression formats.

In the MPEG video compression standards, an image is segmented into a plurality of blocks or zones. While the blocks having much spatial and temporal change are transmitted, previous information is used again with regard to the other blocks, thereby generally reducing the amount of data to be transmitted. In the case of MPEG-2 compression standards, raw data may be compressed by 10 or less times when an image is produced, and by 30 to 40 times when an image is transmitted.

The MPEG video compression performs a bidirectional prediction from the past and future of the video stream. The prediction from the past will be called a forward prediction, and the prediction from the future will be called a backward prediction.

A data string of MPEG compression class includes strings of compressed video and compressed audio. A compression algorithm used in MPEG is based on DCT, and employs image segmentation for dividing an image into a plurality of blocks, motion estimation and compensation, temporal predictive and interpolative methods, etc.

Figure 7:
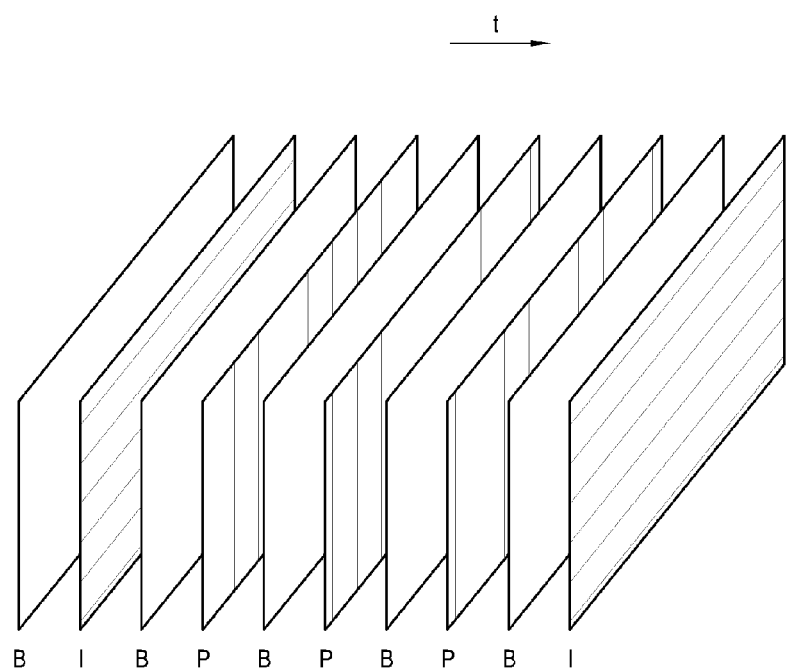
FIG. 7 is an example illustrating a frame structure of a video stream generated by a compression principle of MPEG.

FIG. 7 is an example illustrating a frame structure of a video stream generated by a compression principle of MPEG.

As shown in FIG. 7, the video stream includes a plurality of frames successively arranged with respect to time t. Such a plurality of frames is classified into three types, i.e., an intra-picture (I-picture), an unidirectionally predicted picture (P-picture), and a bidirectionally predicted picture (B-picture). This exemplary embodiment discloses a frame structure where a frame is allocated to each picture. Alternatively, a field structure where a field is allocated to each picture may be also possible.

The I-frame is a reference frame for decoding between frames. The I-frame is an image which is not encoded, and at least one I-frame is needed. The I-frame is generated without using a prediction between the frames. The P-frame is an image of a forward prediction between the frames, and is generated by a prediction between the I-frame and P-the frame. The B-the frame is generated by the bidirectional prediction.

The respective frames are different in the amount of data in accordance with which type among the I-picture, the P-picture and the B-picture the frame is applied. Further, because there is a difference in the amount of data according to the types of frames, the respective frames are different in the amount of data to be processed when the decoder decodes the frame. For example, if the decoder processes the frame divided into 20 blocks by the Image Segmentation, the frames have the same number of blocks, i.e. 20 blocks but are different in the amount of data contained in each block.

Although the demultiplexer outputs the video stream at a constant rate and the decoder also outputs the decoded video stream at a constant rate, the amount of data input to the decoder per unit time is not constant but varied depending on the unit time.

In brief, the reason why the video stream is not directly input to the decoder and thus the buffer is needed for temporarily storing the video stream before the video stream is input to the decoder is as follows.

The decoder cannot process the streams at a constant rate due to difference in a compression format or an encoding characteristic of the stream, and requires a different amount of stream data at each point of processing time. Therefore, the processing rate of the decoder is not matched with the output rate of the stream regardless of whether the output rate of the stream is constant or not in the previous operation of the decoder. Thus, a required amount of stream data needed for decoding is varied depending on an encoding characteristic of the frame to be processed by the decoder, and this variance makes the amount of stream data input to the decoder per unit time be not constant. This also needs a temporary storage for waiting a call from the decoder before the stream is input to the decoder. To this end, the buffer is installed prior to the decoder.

Below, an exemplary embodiment about hardware security technology for more effectively protecting the clean stream than that of FIG. 5 will be described with reference to FIG. 8.

Figure 8:
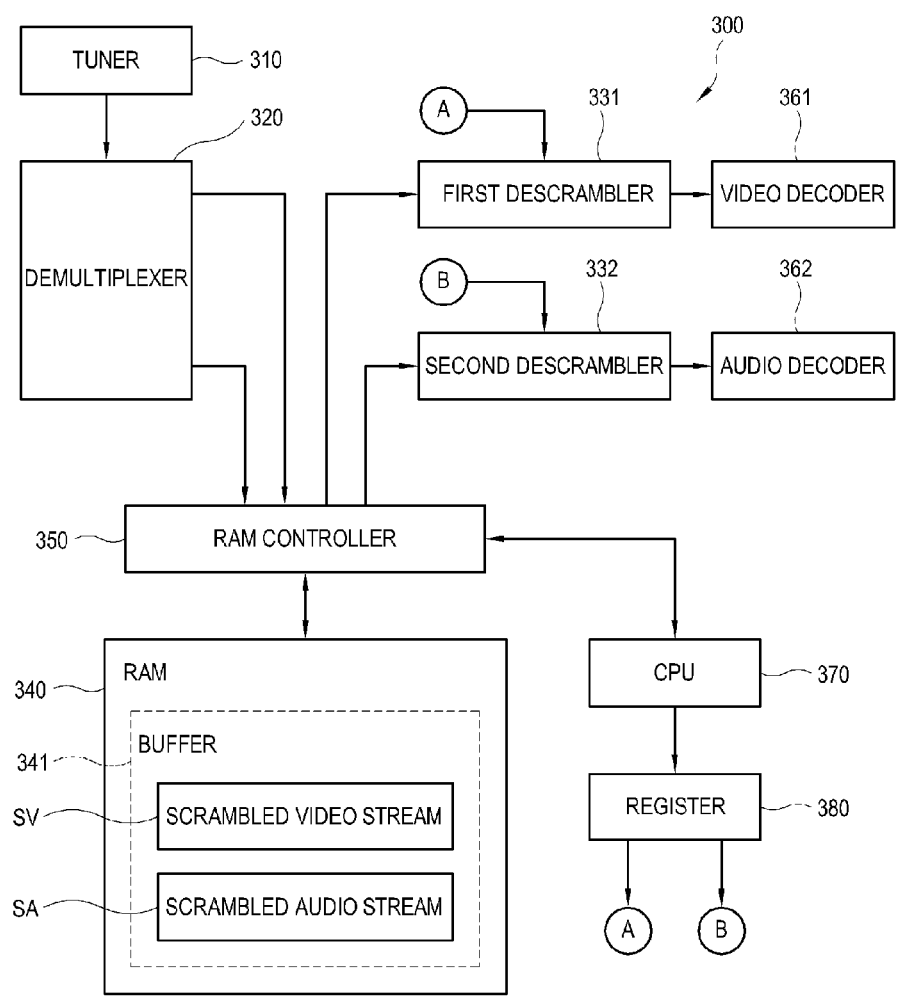
FIG. 8 is a block diagram of a processor according to an exemplary embodiment.

FIG. 8 is a block diagram of a processor 300 according to an exemplary embodiment.

As shown in FIG. 8, the processor 300 includes a demultiplexer 320 which demultiplexes a scrambled transport stream output from a tuner 310, a first descrambler 331 which descrambles a scrambled video stream SV, a second descrambler 332 which descrambles a scrambled audio stream SA, a video decoder 361 which decodes a clean video stream, an audio decoder 362 which decodes a clean audio stream, a CPU 370, and a register 380 in which a secret key for descrambling is recorded to be provided to the first descrambler 331 and the second descrambler 332.

In this exemplary embodiment, a RAM 340 formed with a buffer 341 and a RAM controller 350 controlling the same are arranged prior to the first descrambler 331 and the second descrambler 332 along the direction of the stream.

Below, operations of processing the scrambled transport stream will be described.

The demultiplexer 320 extracts the scrambled video stream SV and the scrambled audio stream SA from the scrambled transport stream output from the tuner 310, and transmits each of them to the RAM controller 350. The RAM controller 350 stores the scrambled video stream SV and the scrambled audio stream SA received from the demultiplexer 320 in the buffer 341 provided inside the RAM 340.

The video decoder 361 makes a request for the video stream to be processed to the RAM controller 350, the audio decoder 362 also makes a request for the audio stream to the RAM controller 350. Thus, the RAM controller 350 acquires the scrambled video stream SV from the buffer 341 and transmits it to the first descrambler 331. Likewise, the RAM controller 350 acquires the scrambled audio stream SA from the buffer 341 and transmits it to the second descrambler 332.

The CPU 370 extracts the secret key from the scrambled transport stream output from the tuner 310 and records it in the register 380. Details of the secret key are the same as those described with reference to FIG. 5.

The first descrambler 331 converts the scrambled video stream SV received from the RAM controller 350 into the clean video stream, based on the secret key recorded in the register 380. The first descrambler 331 transmits the clean video stream to the video decoder 361. Then, the video decoder 361 decodes the clean video stream.

The second descrambler 332 converts the scrambled audio stream SA received from the RAM controller 350 into the clean audio stream, based on the secret key recorded in the register 380. The second descrambler 332 transmits the clean audio stream to the audio decoder 362. Then, the audio decoder 362 decodes the clean audio stream.

As mentioned in such a processing operation, the first descrambler 331 and the second descrambler 332 for descrambling the stream in this exemplary embodiment are structurally arranged to receive scrambled streams from the RAM 340 including the buffer 341. Therefore, the RAM 340 in this exemplary embodiment stores not the clean stream but the scrambled streams SV and SA.

Although a hacker accesses the RAM 340 by a software method, he/she cannot acquire the clean screen from the RAM 340 since the streams SV and SA stored in the RAM 340 is not decrypted yet, i.e., still scrambled. Therefore, it is possible to prevent a hacker from duplicating and leaking the content data without permission.

On the contrary to this exemplary embodiment, the previous exemplary embodiment shown in FIG. 5 discloses that the descramblers 231 and 232 are arranged prior to the RAM 240 and thus the clean streams CV and CA are stored in the RAM 240. Therefore, the clean streams CV and CA leak when a hacker accesses the RAM 240.

According to this exemplary embodiment, the image processing apparatus 100 receives an encrypted image signal and temporarily stores the encrypted image signal in the buffer 341 formed in the RAM 340. The image processing apparatus 100 outputs the encrypted image signal from the buffer 341 to the signal decryptors 331 and 332 in response to the requests of the decoder 361 and 362, and controls the decoders 361 and 362 to decode the image signal decrypted by the signal decryptors 331 and 332.

Thus, a process of decrypting the encrypted image signal, i.e., a process of descrambling the scrambled stream is performed after a buffering process, and it is therefore possible to prevent the clean stream from buffering. Accordingly, the clean stream is protected from leaking due to hacking in the buffering process.

Below, an exemplary embodiment shown in FIG. 8 will be described with reference to FIGS. 9 and 10 in comparison with an exemplary embodiment shown in FIG. 5. In this comparison, description about only the video stream will be shown for convenience of description.

Figure 9:
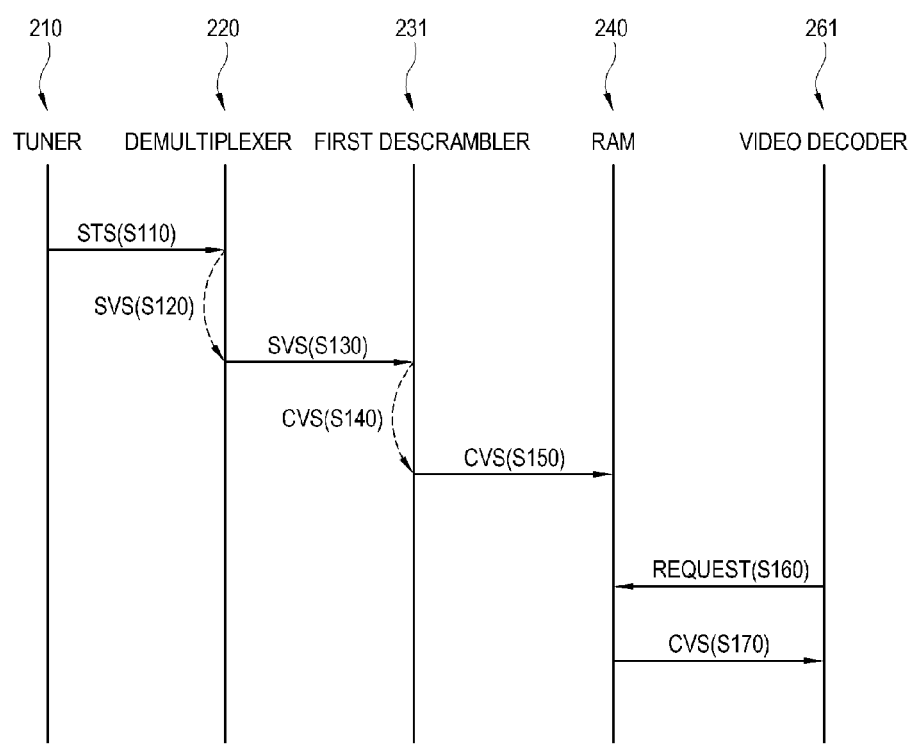
FIG. 9 is an example illustrating a progress of a stream in the processor of FIG. 5.
Figure 10:
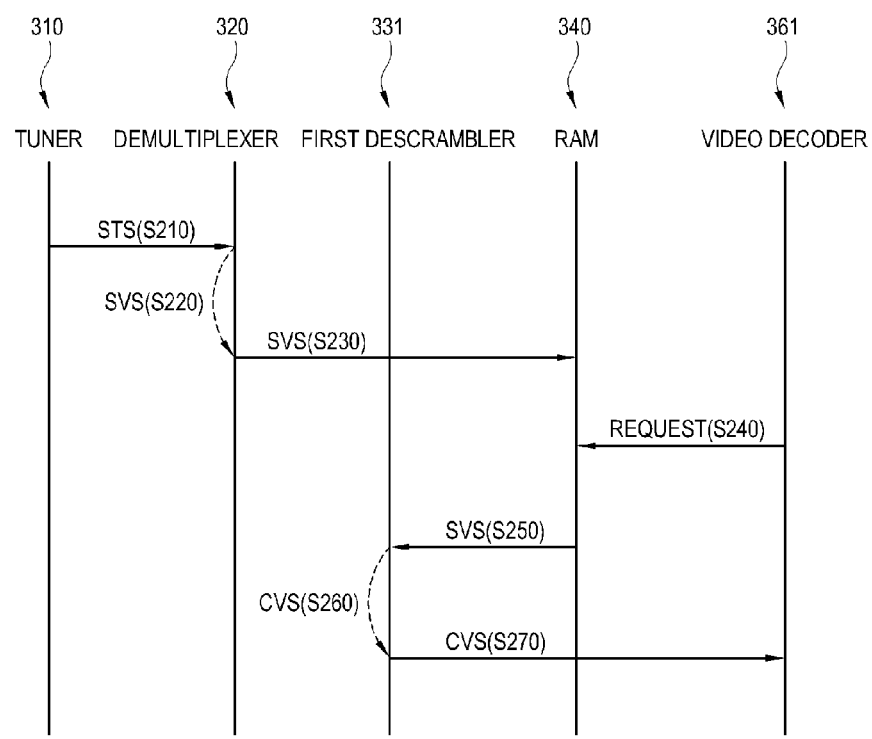
FIG. 10 is an example illustrating a progress of a stream in the processor of FIG. 8.

FIG. 9 is an example illustrating a progress of a stream in the processor of FIG. 5, and FIG. 10 is an example illustrating a progress of a stream in the processor of FIG. 8;

As shown in FIG. 9, according to an exemplary embodiment shown in FIG. 5, the scrambled transport stream STS is transmitted from the tuner 210 to the demultiplexer 220 at operation S110. At operation S120, the scrambled transport stream STS is converted into the scrambled video stream SVS by the demultiplexer 220.

At operation S130, the scrambled video stream SVS is transmitted from the demultiplexer 220 to the first descrambler 231. At operation S140, the scrambled video stream SVS is converted into the clean video stream CVS by the first descrambler 231.

At operation S150, the clean video stream CVS is transmitted from the first descrambler 231 to the RAM 240 and stored in the RAM 240. At operation S160, if the video decoder 261 makes a request for the clean video stream CVS to the RAM 240, at operation S170 the clean video stream CVS is transmitted from the RAM 240 to the video decoder 261.

As shown in FIG. 10, according to an exemplary embodiment shown in FIG. 8, the scrambled transport stream STS is transmitted from the tuner 310 to the demultiplexer 320 at operation S210. At operation S220, the scrambled transport stream STS is converted into the scrambled video stream SVS by the demultiplexer 320.

At operation S230, the scrambled video stream SVS is transmitted from the demultiplexer 320 to the RAM 340 and stored in the RAM 340. At operation S240, if the video decoder 361 makes a request for the scrambled video stream SVS to the RAM 340, at operation S250 the scrambled video stream SVS is transmitted from the RAM 340 to the first descrambler 331.

At operation S260, the scrambled video stream SVS is converted into the clean video stream CVS by the first descrambler 331. At operation S270, the clean video stream CVS is transmitted from the first descrambler 331 to the video decoder 361.

Like this, an exemplary embodiment shown in FIG. 8 is different from an exemplary embodiment shown in FIG. 5 in a target to which the scrambled video stream SVS is transmitted, a state of the video stream stored in the RAM 340, a target to which the video stream is transmitted from the RAM 340 in response to a request of the video decoder 361, and a target by which the clean video stream is finally transmitted to the video decoder 361.

An aspect of an exemplary embodiment shown in FIG. 8 is that the video stream stored in the RAM 340 is not clean but scrambled. Therefore, it is possible to prevent the clean stream from leaking to a hacker even though he/she has access to the RAM 340.

In a foregoing exemplary embodiment shown in FIG. 8, the demultiplexer 320 extracts and outputs the scrambled video stream and the scrambled audio stream from the scrambled transport stream. However, when the stream provider generates the scrambled transport stream, only some the sub-streams may be scrambled while the rest of sub-streams are not scrambled but clean. For example, the scrambled transport stream may include the scrambled video stream and the clean audio stream, and an exemplary embodiment about this will be described with reference to FIG. 11.

Figure 11:
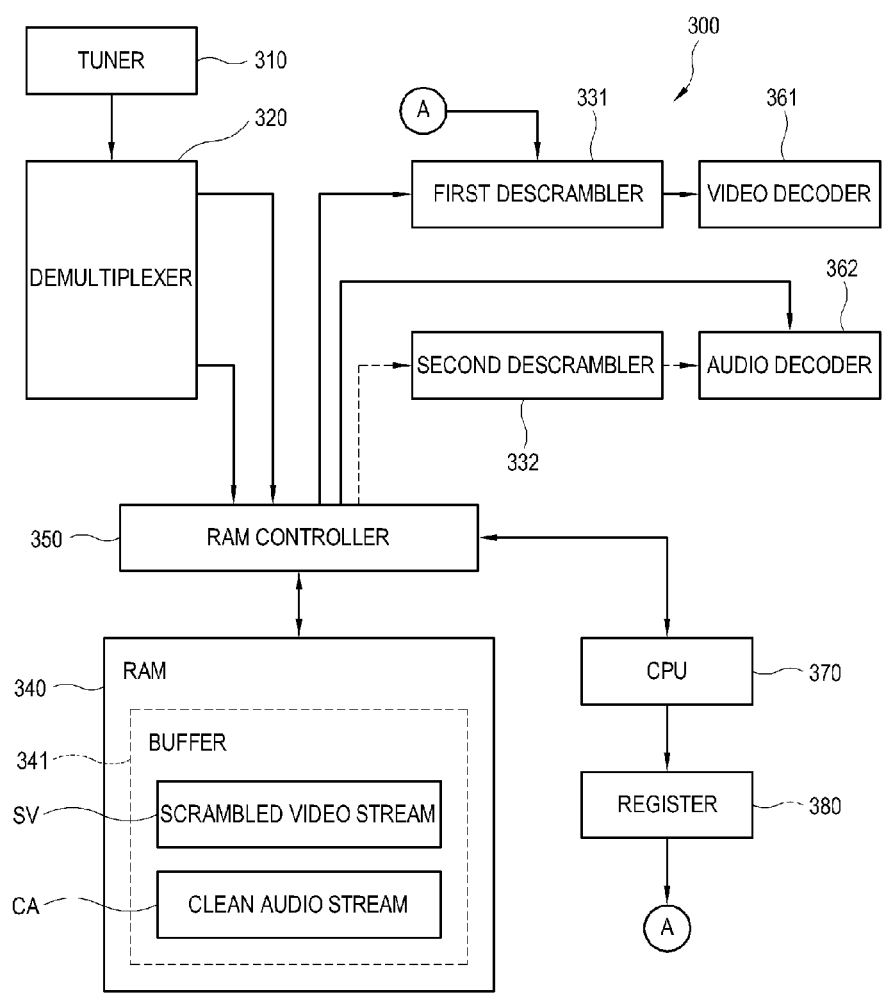
FIG. 11 is a block diagram of a processor according to an exemplary embodiment.

FIG. 11 is a block diagram of a processor 300 according to an exemplary embodiment. Basically, an exemplary embodiment shown in FIG. 11 has the same structure as an exemplary embodiment shown in FIG. 8.

As shown in FIG. 11, the processor 300 includes the demultiplexer 320, the first descrambler 331, the second descrambler 332, the RAM 340, the buffer 341, the RAM controller 350, the video decoder 361, the audio decoder 362, the CPU 370, and the register 380. Since these elements are substantively the same as those of an exemplary embodiment shown in FIG. 8, detailed descriptions thereof will be omitted.

The demultiplexer 320 demultiplexes the scrambled transport stream output from the tuner 310. In this exemplary embodiment, the stream provider generates the scrambled transport stream by scrambling only the video stream, and therefore the demultiplexer 320 extracts the scrambled video stream SV and the clean audio stream CA from the scrambled transport stream, and transmits them to the RAM controller 350.

The RAM controller 350 stores the scrambled video stream SV and the clean audio stream CA in the buffer 341 of the RAM 340. The audio stream is clean when the scrambled transport stream is provided for the first time, whereas the scrambled video stream SV is stored in the RAM 340 as it is scrambled so as to be protected from hacking to the RAM 340.

If the video decoder 361 makes a request for the scrambled video stream SV to the RAM controller 350, the RAM controller 350 transmits the scrambled video stream SV from the buffer 341 to the first descrambler 331. The first descrambler 331 acquires the secret key recorded by the CPU 370 from the register 380, and decrypts the scrambled video stream SV into the clean video stream, thereby transmitting the clean video stream to the video decoder 361.

The CPU 370 uses the previously installed DRM software to acquire the secret key from the scrambled transport stream. In this case, the secret key for only the video stream is acquired from the scrambled transport stream. The CPU 370 records the acquired secret key in the register 380.

Since the clean audio stream CA is stored in the buffer 341, the audio stream does not have to undergo descrambling. Therefore, if the audio decoder 362 makes a request for the clean audio stream CA to the RAM controller 350, the RAM controller 350 bypasses the second descrambler 332 and transmits the clean audio stream CA to the audio decoder 362.

Further, the RAM controller 350 may transmit the clean audio stream CA to the second descrambler 332. In this case, the second descrambler 332 determines whether the received audio stream is scrambled or not, and directly transmits the received audio stream to the audio decoder 362 without the descrambling process if the audio stream is clean.

According to this exemplary embodiment, it is possible to separate and process the transport stream in which the scrambled stream and the clean stream are multiplexed.

In the foregoing exemplary embodiments, the scrambled transport stream includes two scrambled sub-streams of the video stream and the audio stream, but not limited thereto. Alternatively, the scrambled transport stream may include three or more scrambled sub-streams. For example, image content may include video data, audio data, subtitles or information data such as additional data, etc. The processor has to be configured taking the scrambled respective sub-streams into account. In this regard, an exemplary embodiment will be described with reference to FIG. 12.

Figure 12:
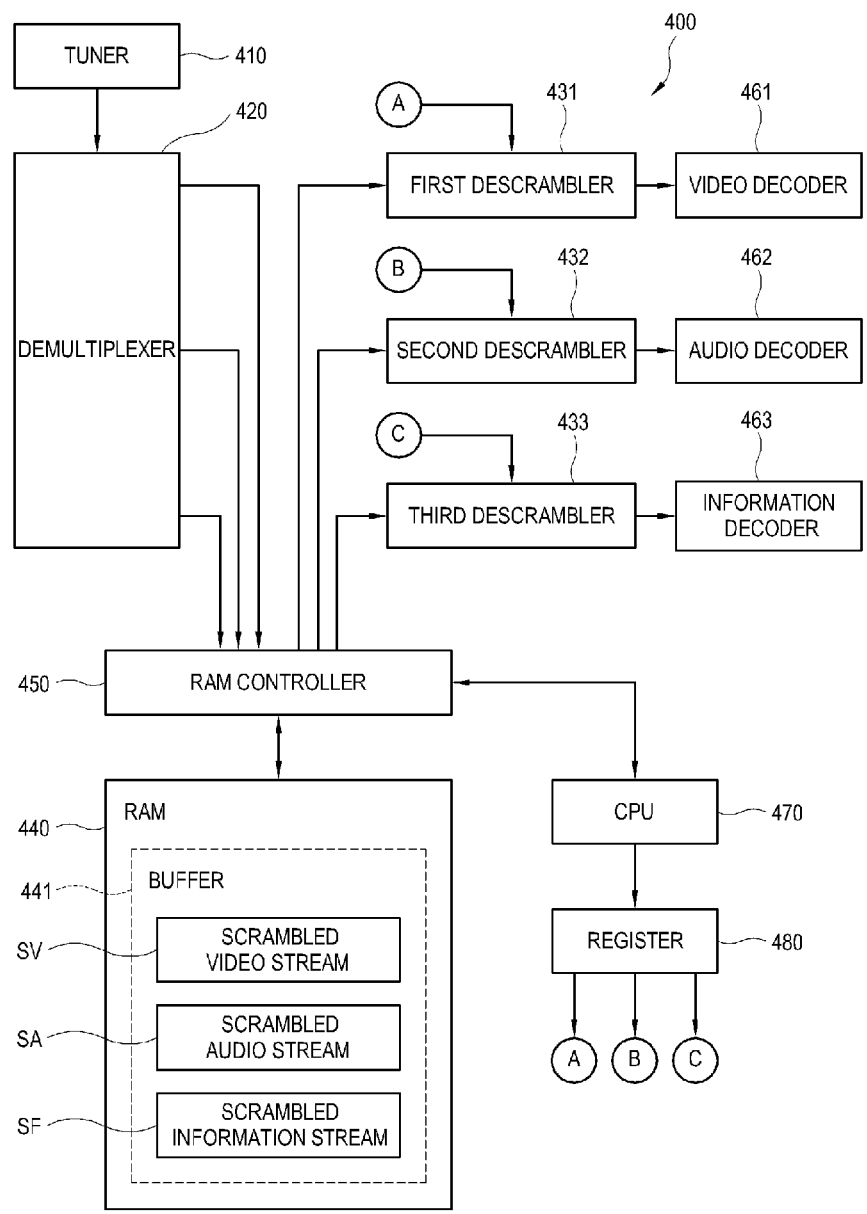
FIG. 12 is a block diagram of a processor according to an exemplary embodiment.

FIG. 12 is a block diagram of a processor 400 according to an exemplary embodiment.

As shown in FIG. 12, a demultiplexer 420 extracts a scrambled video stream SV, a scrambled audio stream SA and a scrambled information stream (SF) by demultiplexing a scrambled transport stream output from a tuner 410, and transmits the extracted streams to a RAM controller 450.

The RAM controller 450 controls a buffer 441 of a RAM 440 to store the scrambled video stream SV, the scrambled audio stream SA, and the scrambled information stream SF output from the demultiplexer 420.

A CPU 470 processes the scrambled transport stream output from the tuner 410, and acquires the secret keys respectively corresponding the scrambled video stream SV, the scrambled audio stream SA, and the scrambled information stream SF. The CPU 470 records the acquired secret keys in the register 480.

If a video decoder 461 makes a request for the video stream to the RAM controller 450, the RAM controller 450 transmits the scrambled video stream SV stored in the buffer 441 to a first descrambler 431. The first descrambler 431 acquires the secret key corresponding to the scrambled video stream SV from the register 480, and decrypts the scrambled video stream SV with the corresponding secret key, thereby generating the clean video stream. The first descrambler 431 outputs the generated clean video stream to the video decoder 461. The video decoder 461 decodes the received clean video stream.

If an audio decoder 462 makes a request for the audio stream to the RAM controller 450, the RAM controller 450 transmits the scrambled audio stream SA stored in the buffer 441 to a second descrambler 432. The second descrambler 432 acquires a secret key corresponding to the scrambled audio stream SA from the register 480, and decrypts the scrambled audio stream SA with the corresponding secret key, thereby generating the clean audio stream. The second descrambler 432 outputs the generated clean audio stream to the audio decoder 462. The audio decoder 462 decodes the received clean audio stream.

Likewise, if an information decoder 463 makes a request for an information stream to the RAM controller 450, the RAM controller 450 transmits the scrambled information stream SF stored in the buffer 441 to the third descrambler 433. A third descrambler 433 acquires the secret key corresponding to the scrambled information stream SF from the register 480, and decrypts the scrambled information stream SF with the corresponding secret key, thereby generating the clean information stream. The third descrambler 433 outputs the generated clean information stream to the information decoder 463. The information decoder 463 decodes the received clean information stream.

Thus, the processor 400 may be configured in accordance with the characteristics of the scrambled transport stream.

In the foregoing exemplary embodiments, the stream provided by the stream provider is an analog signal. An analog stream is converted into a digital stream by the tuner, and then demultiplexed by the demultiplexer. However, the stream provided by the stream provider may be a digital packet stream. In this case, not the foregoing processes of the tuner and the demultiplexer but another process is needed. An exemplary embodiment related to this will be described with reference to FIG. 13.

Figure 13:
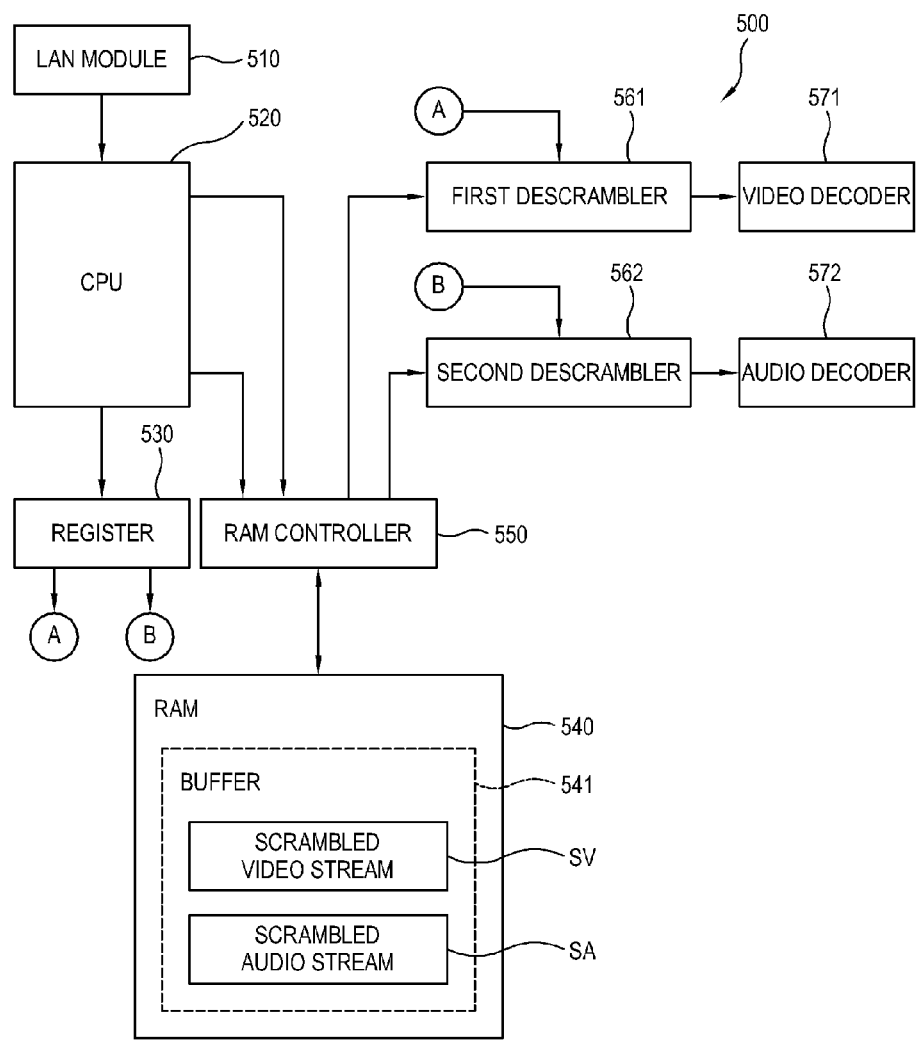
FIG. 13 is a block diagram of a processor according to an exemplary embodiment.

FIG. 13 is a block diagram of a processor 500 according to an exemplary embodiment.

As shown in FIG. 13, the stream provider may provide a digital packet of a scrambled transport stream through Internet or the like network. A LAN module 510 receives such a scrambled transport stream and transmits it to a CPU 520.

The CPU 520 extracts the scrambled video stream SV and the scrambled audio stream SA from the scrambled transport stream by analyzing the packet of the scrambled transport stream, and then transmits it to a RAM controller 550. Further, the CPU 520 extracts the secret key from the scrambled transport stream and records the secret key in a register 530.

This exemplary embodiment is different from the foregoing exemplary embodiments in receiving not the analog stream but a digital stream through the network. In this exemplary embodiment, the received digital stream is separated into sub-streams by the CPU 520.

The RAM controller 550 stores the scrambled video stream SV and the scrambled audio stream SA received from the CPU 520 in a buffer 541 of a RAM 540. In particular, the scrambled transport stream in this exemplary embodiment is received from the stream provider through the network, the data amount of scrambled transport stream output from the LAN module 510 per unit time may be varied depending on whether a communication environment is good or bad. Thus, the buffer 541 temporarily stores the scrambled video stream SV and the scrambled audio stream SA, and thus makes a video decoder 571 and an audio decoder 572 to output the stream at a rate as constant as possible.

The following operations are substantively the same as those of the foregoing exemplary embodiments. If the video decoder 571 makes a request for a video stream, the RAM controller 550 transmits the scrambled video stream SV from the buffer 541 to a first descrambler 561. The first descrambler 561 converts the scrambled video stream SV into a clean video stream and transmits the clean video stream to the video decoder 571, and then the video decoder 571 decodes the clean video stream.

If an audio decoder 572 makes a request for an audio stream, the RAM controller 550 transmits the scrambled audio stream SA from the buffer 541 to a second descrambler 562. The second descrambler 562 converts the scrambled audio stream SA into a clean audio stream and transmits the clean audio stream to the audio decoder 572, and then the audio decoder 572 decodes the clean audio stream.

With this method, it is possible to process the digital transport stream provided from the stream provider.

The foregoing exemplary embodiments describe that, when the stream provider provides scrambled analog/digital streams of image contents, the scrambled streams are decrypted into the clean streams. By the way, a user may want to personally store and possess an image content processed into a clean stream and displayed as an image while using the image processing apparatus 100. Below, such a method of storing and possessing the image content will be called personal video recording (PVR).

To perform the PVR, a condition for protecting the content has to be satisfied. That is, the stream of the image content stored in the image processing apparatus 100 by the PVR has to be scrambled before the possession. If the clean stream generated by the forgoing exemplary embodiments is directly stored in the image processing apparatus 100, the clean stream may leak to a hacker by his/her attack. The secret key provided by the stream provider may be used when the image processing apparatus 100 scrambles the clean stream again. However, the image processing apparatus 100 may use its own secret key so that the descrambling can be enabled only in the corresponding image processing apparatus 100.

Below, the process of performing the PVR will be described with reference to FIG. 14.

Figure 14:
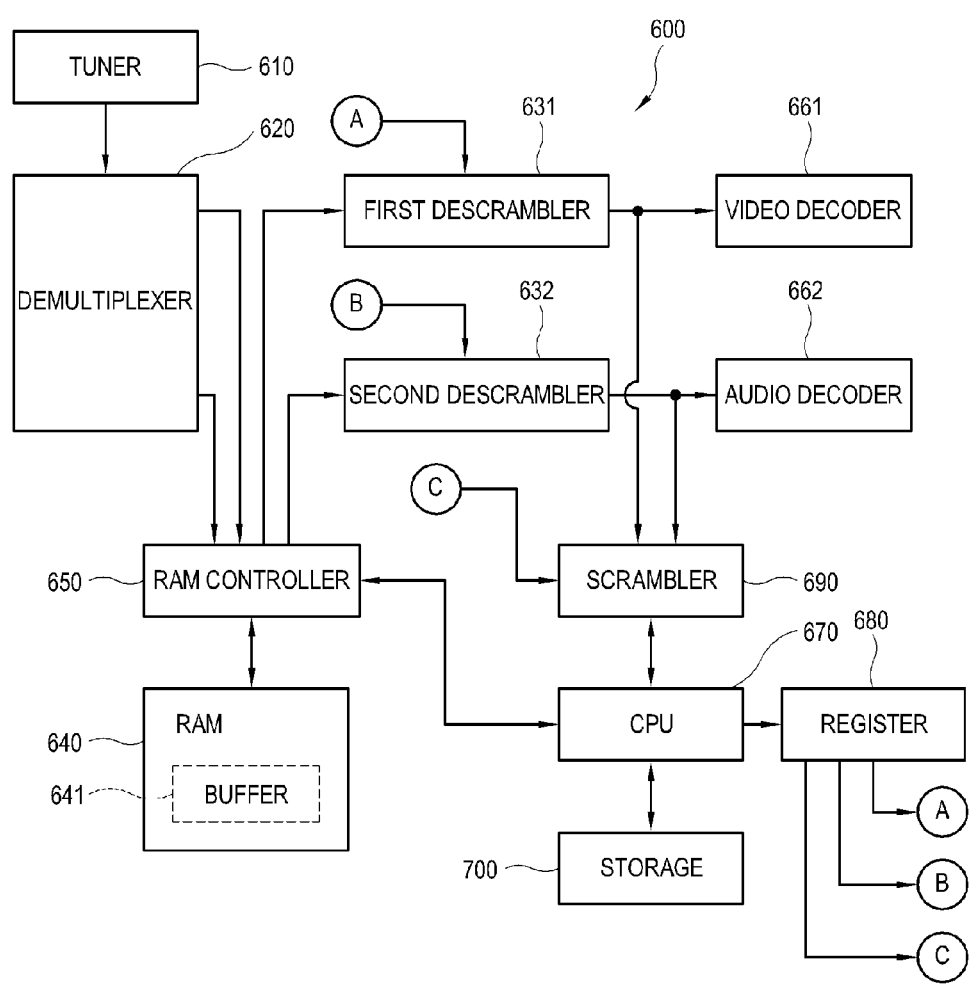
FIG. 14 is a block diagram of a processor according to an exemplary embodiment.

FIG. 14 is a block diagram of a processor 600 according to an exemplary embodiment.

As shown in FIG. 14, the processor 600 includes a demultiplexer 620, a first descrambler 631, a second descrambler 632, a RAM 640, a buffer 641, a RAM controller 650, a video decoder 661, an audio decoder 662, a CPU 670 and a register 680. The operations of the elements according to an exemplary embodiment shown in FIG. 14 are substantively the same as those of an exemplary embodiment described with reference to FIG. 8.

However, according to an exemplary embodiment shown in FIG. 14, stream output terminals are respectively branched from the first descrambler 631 and the second descrambler 632, so that branched streams can be input to the scrambler 690.

The scrambler 690 scrambles the received clean video stream and clean audio stream into the scrambled video stream and the scrambled audio stream. Like the descrambling, the scrambling needs the secret key, and the CPU 670 generates the secret key for the scrambling of the scrambler 690 by itself, and records it in the register 680. The scrambler 690 acquires the secret key recorded in the register 680, and performs the scrambling based on the secret key. The scrambler 690 transmits the generated scrambled video and audio streams to the CPU 670.

The secret key to be used by the scrambler 690 may be the same as the secret keys respectively used in the first descrambler 631 and the second descrambler 632. Otherwise, the CPU 670 processes unique identification information of the image processing apparatus 100 through the preset DRM software, and thus generates the secret key based on the unique identification information of the image processing apparatus 100. To prevent the secret key from leaking to the exterior, the secret key is not generated and maintained in the image processing apparatus when the scrambling is not executed, but generated and recorded in the register 680 only when the scrambler 690 performs the scrambling. If the scrambler 690 completes the scrambling, the CPU 670 deletes the corresponding secret key from the register 680.

The unique identification information of the image processing apparatus 100 may contain various pieces of information for distinguishing the corresponding image processing apparatus 100 from another image processing apparatus, and may for example include a serial number of the CPU 670, a media access control (MAC) address, a production number of the processor 600, a model number of the image processing apparatus 100, or the like various pieces of information.

Below, the process of performing the PVR according to an exemplary embodiment will be described.

The demultiplexer 620 extracts the scrambled video stream and the scrambled audio stream by demultiplexing the scrambled transport stream output from the tuner 610, and transmits them to the RAM controller 650. The RAM controller 650 stores the scrambled video stream and the scrambled audio stream in the buffer 641 of the RAM 640. The CPU 670 acquires the secret key based on the scrambled transport stream output from the tuner 610, and stores the secret key in the register 680.

The RAM controller 650 respectively transmits the scrambled video and audio streams stored in the buffer 641 to the first descrambler 631 and the second descrambler 632 in response to the respective requests of the video decoder 661 and the audio decoder 662. The first descrambler 631 and the second descrambler 632 performs the descrambling with the secret key recorded in the register 680, and outputs the clean video stream and the clean audio stream to the video decoder 661 and the audio decoder 662, respectively.

The clean video stream output from the first descrambler 631 and the clean audio stream output from the second descrambler 632 are input to the scrambler 690. At this time, the CPU 670 generates the secret key for the scrambling and records it in the register 680.

The scrambler 690 respectively converts the clean video stream and the clean audio stream into the scrambled video stream and the scrambled audio stream with the secret key recorded in the register 680. Even in this process, the clean video stream and the clean audio stream are prevented from leaking to the exterior since they are not stored in the RAM 640.

The scrambler 690 transmits the scrambled video stream and the scrambled audio stream to the CPU 670. The CPU 670 stores the scrambled video stream and the scrambled audio stream in a storage 700, i.e., a nonvolatile memory. Further, the scrambler 690 may directly store the scrambled video stream and the scrambled audio stream in the storage 700 without the CPU 670.

Below, a process of reproducing the stream, which is stored by the PVR in the storage 700, will be described.

If an event of reproducing the scrambled stream stored in the storage 700 occurs, the CPU 670 reads the scrambled video stream and the scrambled audio stream, which are selected to be reproduced, from the storage 700. The CPU 670 transmits the read scrambled video and audio streams to the RAM controller 650. The RAM controller 650 stores the corresponding scrambled video and audio streams in the buffer 641 of the RAM 640.

Further, the CPU 670 repeats the foregoing process of generating the secret key for the scrambling of the scrambler 690. That is, the CPU 670 generates the secret key based on the unique identification information of the image processing apparatus 100 and records the generated secret key in the register 680.

In response to the request of the video decoder 661, the RAM controller 650 transmits the scrambled video stream stored in the buffer 641 to the first descrambler 631. The first descrambler 631 generates the clean video stream with the secret key recorded in the register 680. The secret key used by the first descrambler 631 is the secret key generated by the CPU 670 based on the unique identification information of the image processing apparatus 100. The first descrambler 631 outputs the clean video stream to the video decoder 661, and the video decoder 661 decodes the clean video stream.

In response to the request of the audio decoder 662, the RAM controller 650 transits the scrambled audio stream stored in the buffer 641 to the second descrambler 632. The second descrambler 632 generates the clean audio stream with the secret key recorded in the register 680. The second descrambler 632 outputs the clean audio stream to the audio decoder 662, and the audio decoder 662 decodes the clean audio stream.

With this method, it is possible to perform the PVR for the scrambled transport stream, and reproduce the video stream recorded by the PVR.

Below, a control method of the image processing apparatus 100 will be described.

Figure 15:
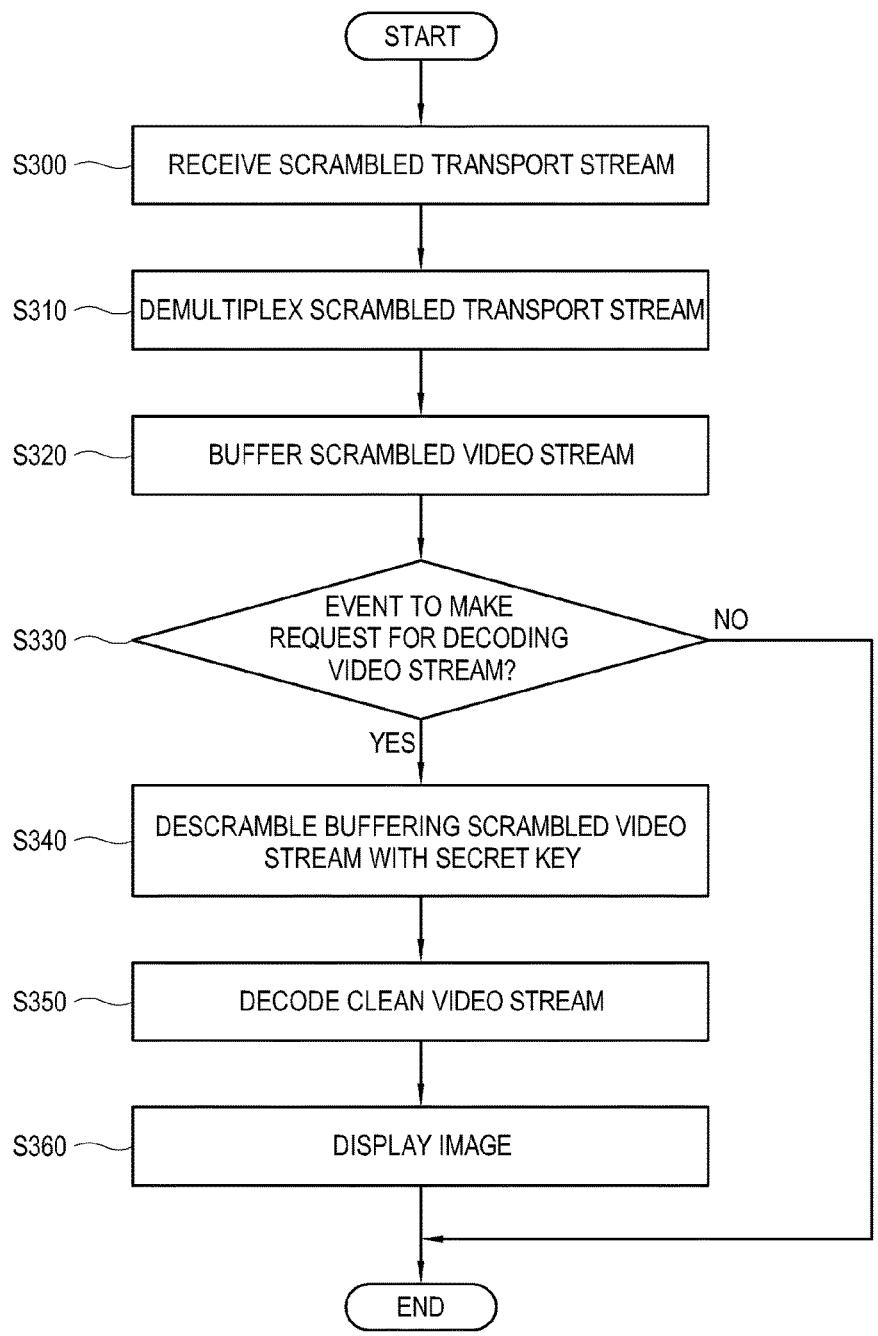
FIG. 15 is a flowchart showing a control method of an image processing apparatus according to an exemplary embodiment.

FIG. 15 is a flowchart showing a control method of an image processing apparatus 100 according to an exemplary embodiment.

The structure of the image processing apparatus 100 according to this exemplary embodiment conforms to an exemplary embodiment shown in FIG. 8.

As shown in FIG. 15, at operation S300 the image processing apparatus 100 receives the scrambled transport stream. At operation S310, the image processing apparatus 100 extracts the scrambled video stream by demultiplexing the scrambled transport stream. At operation S320, the image processing apparatus 100 buffers the scrambled video stream.

At operation S330, the image processing apparatus 100 determines whether an event to make a request for decoding the video stream occurs or not.

If it is determined in the operation S330 that the event to make a decoding request does not occur, the image processing apparatus 100 is standing by until the corresponding event occurs.

If it is determined in the operation S330 that the event to make the decoding request occurs, at operation S340 the image processing apparatus 100 descrambles the buffering scrambled video stream with the secret key and generates the clean video stream. At operation S350 the image processing apparatus 100 decodes the clean video stream. At operation S360 the image processing apparatus 100 displays an image.

Through such operations, the image processing apparatus 100 processes the scrambled transport stream to be displayed as an image.

Figure 16:
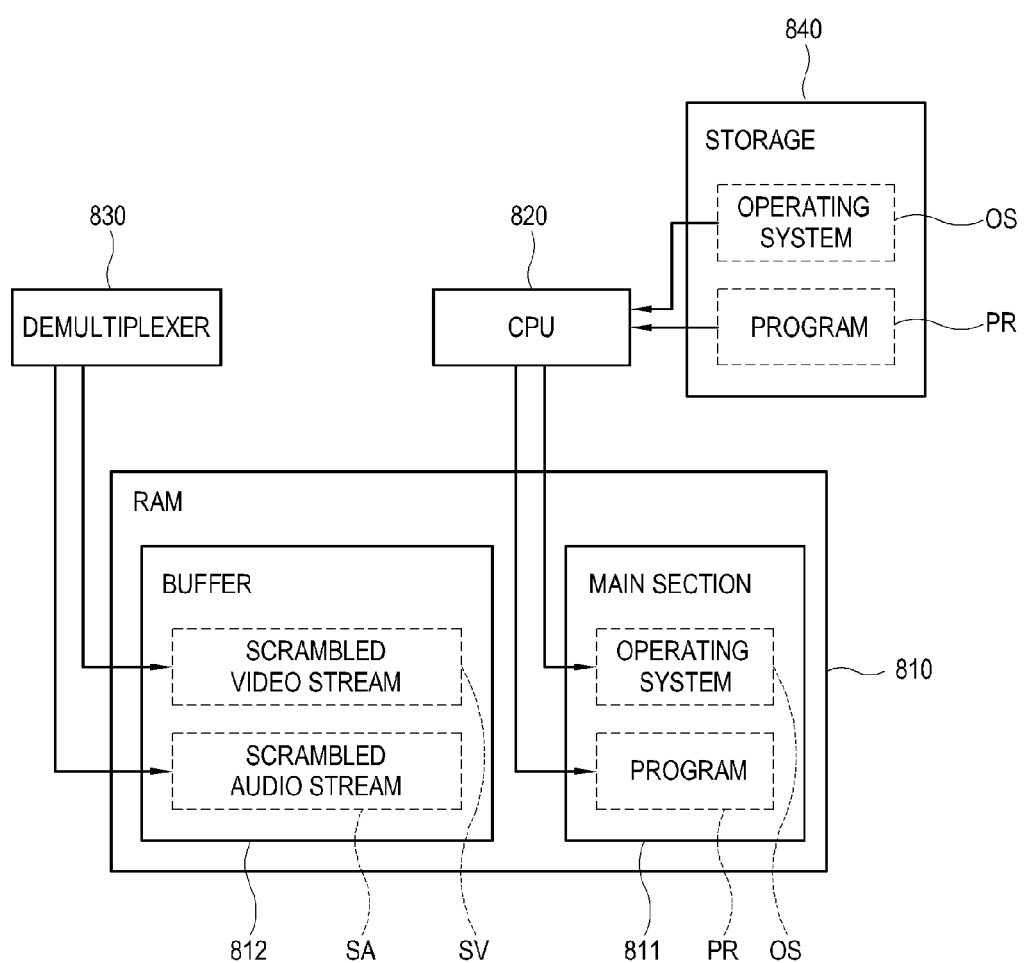
FIG. 16 is a block diagram showing a principle of operating a RAM according to an exemplary embodiment.

FIG. 16 is a block diagram showing a principle of operating a RAM according to an exemplary embodiment. In this exemplary embodiment, a RAM 810 may be superseded by those of the foregoing exemplary embodiments.

As shown in FIG. 16, the RAM 810 stores the stream/data output from a demultiplexer 830 or processed by a CPU 820.

The RAM 810 has a storage area for storing the data, which is divided into a main section 811 and a buffer 812. That is, the main section 811 and the buffer 812 respectively occupy different areas within the RAM 810. Each address range or each storage area size of the main section 811 and the buffer 812 within the RAM 810 may be statically set by a default, or may be dynamically varied. The sizes of the main section 811 and the buffer 812 may be varied depending on requests of various elements accessing the RAM 810.

The main section 811 is a storage area that plays a basic role of the RAM 810, to which the operating system OS to be processed by the CPU or a program PR is loaded. The CPU 820 calls the operating system OS or program PR stored in the nonvolatile memory, i.e., a storage 840 and loads it to the main section 811 of the RAM 810, thereby executing the operating system OS or program PR loaded to the main section 811. For example, when the system is powered on, the CPU 820 calls the operating system OS stored in the storage 840 and loads it to the main section 811, thereby executing the loaded operating system OS and booting up the system. While the operating system OS is running after the booting, the CPU 820 calls the program PR stored in the storage 840 and loads it to the main section 811, thereby executing the corresponding PR on the operating system OS.

The main section 811 may be partitioned into sub-sections corresponding to various functions in accordance with operations of the CPU 820 or operating system OS. For example, the main section 811 is divided into a plurality of partitions, and each partition may include a normal partition to which normal data is loaded and a hidden partition to which data requiring security is loaded.

The buffer 812 is an area of the RAM 810, in which the scrambled video (SV) and scrambled audio stream SAs output from the demultiplexer 830 are temporarily stored before being input to the decoder. The buffer 812 may be superseded by those of the foregoing exemplary embodiments, and thus repetitive descriptions will be avoided.

In the RAM 810, the main section 811 and the buffer 812 may be divided by various methods. For example, when the RAM 810 is designed for the first time, sub-memory chips in the RAM 810 may be respectively divided into and designated as the main section 811 and the buffer 812. However, in this case, processes are added corresponding to the design, and it is impossible to dynamically realize the main section 811 and the buffer 812. Further, when the RAM 810 is installed in the image processing apparatus 100 according to an exemplary embodiment, a problem arises in that such a designed RAM 810 has to be applied thereto.

Taking this into account, the main section 811 and the buffer 812 may be divided with respect to software. Below, an exemplary embodiment about this will be described with reference to FIG. 17.

Figure 17:
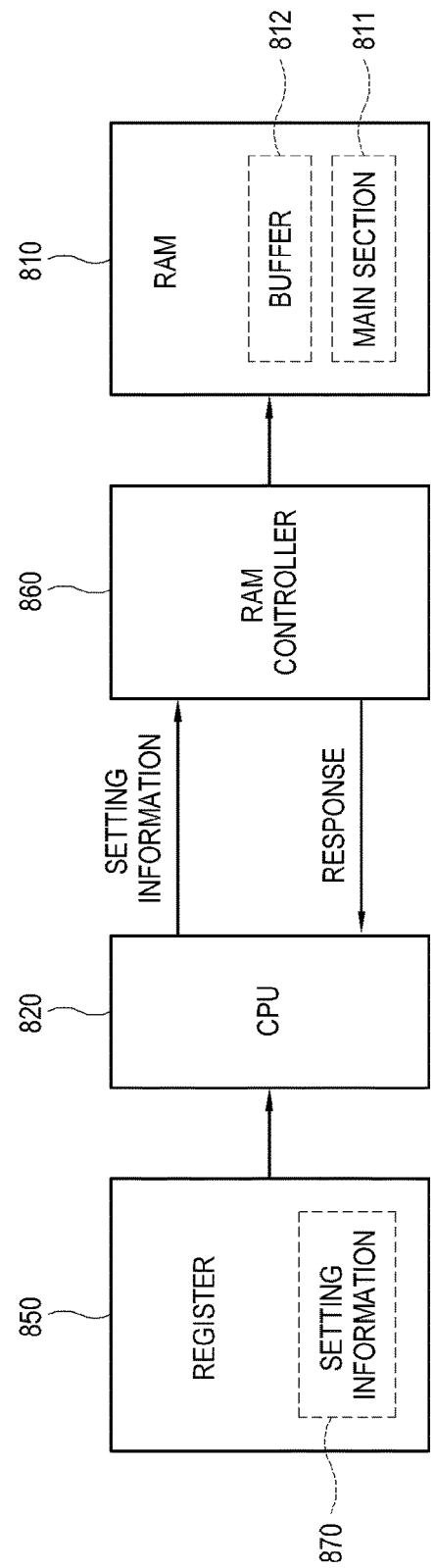
FIG. 17 is a block diagram showing a principle that the RAM is partitioned and designated as a main section and a buffer according to an exemplary embodiment.

FIG. 17 is a block diagram showing a principle that the RAM 810 is partitioned into and designated as a main section 811 and a buffer 812 according to an embodiment.

As shown in FIG. 17, the CPU 820 acquires setting information 870 from a register 850 when the image processing apparatus 100 is booted up. The setting information 870 includes the model number of the RAM 810, the size of storage area, the address range occupied by the main section 811, the address range occupied by the buffer 812 and the like information. The CPU 820 transmits the acquired setting information 870 to the RAM controller 860.

The RAM controller 860 divides the RAM 810 into the main section 811 and the buffer 812 based on the setting information 870 with respect to software. If the division is completed, the RAM controller 860 responds to the CPU 820 with a signal for informing that the division is completed. The CPU 820 determines that the RAM 810 is partitioned into the main section 811 and the buffer 812 in response to the RAM controller 860.

At this time, the RAM controller 860 acquires the model number of the RAM 810 by itself, and determines whether the acquired model number of the RAM 810 is matched with the setting information 870. The RAM controller 860 divides the RAM 810 based on the setting information if the acquired model number of the RAM 810 is matched with the setting information 870. On the other hand, the RAM controller 860 may warn the CPU 820 if the acquired model number of the RAM 810 is not matched with the setting information 870.

After the RAM 810 is partitioned, the RAM controller 860 stores the stream received from the demultiplexer 830 in the storage area of the address range corresponding to the buffer 812 in the RAM 810, and stores the data received from the CPU 820 in the storage area of the address range corresponding to the main section in the RAM 810. In addition, the RAM controller 860 searches the storage area of the address range corresponding to the buffer 812 in the RAM 810 if the request for the stream is received from the decoder.

With this method, the RAM 810 partitioned into the main section 811 and the buffer 812 is used.

In the foregoing exemplary embodiments, the input/output of the stream to/from the buffer is performed by the RAM controller. However, the CPU may integrate with the RAM controller or the CPU may have a built-in RAM controller. In this case, the CPU controls the input/output of the stream to/from the buffer. Below, an exemplary embodiment related to this will be described with reference to FIG. 18.

Figure 18:
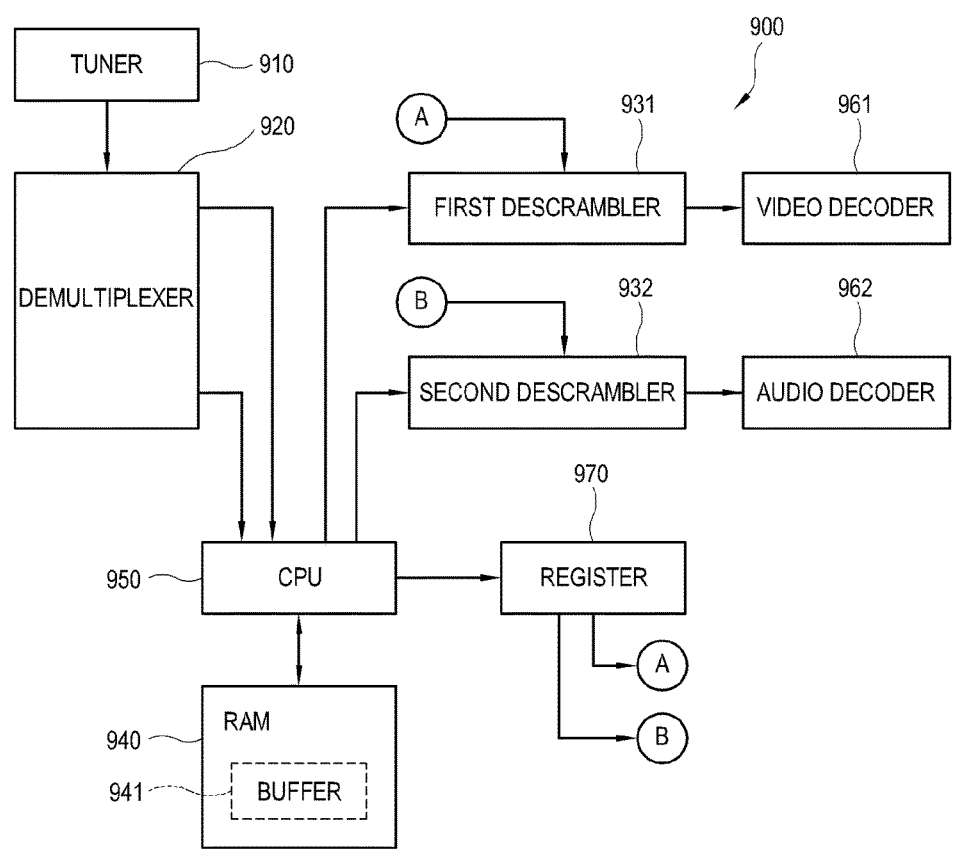
FIG. 18 is a block diagram of a processor according to an exemplary embodiment.

FIG. 18 is a block diagram of a processor 900 according to an exemplary embodiment.

As shown in FIG. 18, the processor 900 includes a demultiplexer 920, a first scrambler 931, a second scrambler 932, a RAM 940, a buffer 941, a CPU 950, a video decoder 961, an audio decoder 962 and a register 970. Basic operations and function of the respective elements are superseded by those of exemplary embodiment shown in FIG. 8, and thus repetitive descriptions will be avoided as necessary.

The demultiplexer 920 demultiplexes the scrambled transport stream output from the tuner 910 into the scrambled video stream and the scrambled audio stream, and transmits them to the CPU 950.

The CPU 950 temporarily stores the scrambled video stream and the scrambled audio stream from the demultiplexer 920 in the buffer 941 of the RAM 940. Further, the CPU 950 extracts the secret key by processing the scrambled transport stream output from a tuner 910 with a preset DRM software program, and records the extracted secret key in the register 970.

If the video decoder 961 makes a request for the stream, the CPU 950 calls the scrambled video stream from the buffer 941 in response to the request of the video decoder 961 and transmits the scrambled video stream to the first descrambler 931. Further, if the audio decoder 962 makes a request for the stream, the CPU 950 calls the scrambled audio stream from the buffer 941 in response to the request of the audio decoder 962 and transmits the scrambled audio stream to the second descrambler 932.

The first descrambler 931 converts the scrambled video stream into the clean video stream based on the secret key of the register 970, and transmits the clean video stream to the video decoder 961. Further, the second descrambler 932 converts the scrambled audio stream into the clean audio stream based on the secret key of the register 970, and transmits the clean audio stream to the audio decoder 962.

With this method, the CPU 950 can control the input/output of the stream to/from the buffer 941.

Processes, functions, methods, programs, applications, and/or software in apparatuses described herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

Although a few exemplary embodiments have been shown and described, it will be appreciated by those skilled in the art that changes may be made in these exemplary embodiments without departing from the principles and spirit of the disclosure, the scope of which is defined in the appended claims and their equivalents.

What is claimed is:

1. An image processing apparatus comprising:
    a signal receiver configured to receive an encrypted compressed image signal;
    a storage to form a buffer;
    a signal decryptor configured to convert the encrypted compressed image signal into a decrypted compressed image signal by decrypting the encrypted compressed image signal with a secret decryption key to output the decrypted compressed image signal;
    a decoder configured to decode the decrypted compressed image signal to output a decoded image signal for display of an image based on the decoded image signal; and
    a controller for the storage, configured to:
        in response to the signal receiver receiving the encrypted compressed image signal, store the received encrypted compressed image signal in the buffer formed in the storage, and
        in response to the decoder requesting to transmit an amount of the compressed image signal, transmit an amount of the encrypted compressed image signal corresponding to the requested amount of the compressed image signal from the buffer to the signal decryptor, to cause the signal decryptor to decrypt the transmitted amount of the encrypted compressed image signal, with the secret decryption key, to output an amount of the compressed image signal for the decoder to decode,
    wherein the signal decryptor is arranged to transmit the decrypted compressed image signal to the decoder without buffering the decrypted compressed image signal.

2. The image processing apparatus according to claim 1, further comprising a central processing unit (CPU), wherein the storage stores data to be processed by the CPU.

3. The image processing apparatus according to claim 2, further comprising a demultiplexer configured to demultiplex the encrypted compressed image signal received by the signal receiver.

4. The image processing apparatus according to claim 2, wherein the CPU is configured to:
    extract the secret decryption key from the encrypted compressed image signal received by the signal receiver, and
    store the extracted secret decryption key in a register to which the signal decryptor is to have access.

5. The image processing apparatus according to claim 4, wherein the CPU is further configured to delete the secret decryption key from the register, in response to the signal decryptor completing converting the encrypted compressed image signal into the decrypted compressed image signal.

6. The image processing apparatus according to claim 1, wherein the controller is further configured to transmit a compressed image signal stored in the storage to the decoder by bypassing the signal decryptor if the compressed image signal stored in the storage is not encrypted.

7. The image processing apparatus according to claim 1, wherein the controller is further configured to, after transmitting the amount of the stored encrypted compressed image signal corresponding to the requested amount of the compressed image signal, delete the transmitted amount of the stored encrypted compressed image signal from the formed buffer by the storage.

8. The image processing apparatus according to claim 1, further comprising:
    an encryptor configured to encrypt the decrypted compressed image signal from the signal decryptor based on a secret encryption key; and
    another storage configured to store the encryptor-encrypted compressed image signal encrypted by the encryptor.

9. The image processing apparatus according to claim 8, wherein the secret encryption key is generated based on unique identification information of the image processing apparatus.

10. A method of controlling an image processing apparatus, the method comprising:
    receiving an encrypted compressed image signal;
    storing the received encrypted compressed image signal in a buffer formed in a storage;
    in response to a decoder requesting to transmit an amount of a compressed image signal, transmitting an amount of the encrypted compressed image signal corresponding to the requested amount of the compressed image signal from the buffer to a signal decryptor;
    converting, using the signal decryptor, the amount of the encrypted compressed image signal corresponding to the transmitted amount of the encrypted compressed image signal into an amount of a decrypted compressed image signal with a secret decryption key, to output the amount of the decrypted compressed image signal for a decoder to decode; and
    decoding, using the decoder, the amount of the compressed image signal corresponding to the output amount of the decrypted compressed image signal, to output a decoded image signal for display of an image based on the decoded image signal,
    wherein the signal decryptor is arranged to transmit the decrypted compressed image signal to the decoder without buffering the decrypted compressed image signal.

11. The method according to claim 10, wherein the storage stores data to be processed by a central processing unit (CPU) of the image processing apparatus.

12. The method according to claim 11, wherein the receiving the encrypted compressed image signal further comprises demultiplexing the encrypted compressed image signal.

13. The method according to claim 11, wherein the converting the amount of the stored encrypted compressed image signal corresponding to the transmitted amount of the stored encrypted compressed image signal into the amount of the decrypted image signal comprises:
- extracting the secret decryption key from the encrypted compressed image signal; and
- storing the extracted secret decryption key in a register to which the signal decryptor is to have access.

14. The method according to claim 13, wherein the converting the amount of the stored encrypted compressed image signal corresponding to the transmitted amount of the stored encrypted compressed image signal into the amount of the decrypted image signal further comprises deleting the secret decryption key from the register in response to complete the decrypting the transmitted amount of the encrypted compressed image signal.

15. The method according to claim 10, further comprising:
- encrypting the decrypted compressed image signal with a secret encryption key; and
- storing the secret encryption key-encrypted image signal.

16. The method according to claim 15, wherein the secret encryption key is generated based on unique identification information of the image processing apparatus.

17. At least one non-transitory computer readable medium storing computer-readable instructions which is to, when executed, control at least one processor to implement a method of claim 10.

* * * * *